US006991741B2

(12) United States Patent
Bullock et al.

(10) Patent No.: US 6,991,741 B2
(45) Date of Patent: Jan. 31, 2006

(54) CONTROLLED ROOM TEMPERATURE SYNTHESIS OF MAGNETIC METAL OXIDE NANOCLUSTERS WITHIN A DIBLOCK COPOLYMER MATRIX

(75) Inventors: Steven Bullock, Silver Spring, MD (US); Sufi Rizwan Ahmed, Silver Spring, MD (US); Peter Kofinas, North Bethesda, MD (US)

(73) Assignee: University of Maryland, College Park, MD (US)

( * ) Notice: Subject to any disclaimer, the term of this patent is extended or adjusted under 35 U.S.C. 154(b) by 124 days.

(21) Appl. No.: 10/250,433

(22) PCT Filed: Nov. 29, 2002

(86) PCT No.: PCT/US02/36137

§ 371 (c)(1), (2), (4) Date: Jun. 30, 2003

(87) PCT Pub. No.: WO2004/009605

PCT Pub. Date: Jan. 29, 2004

(65) Prior Publication Data

US 2004/0238783 A1 Dec. 2, 2004

Related U.S. Application Data

(60) Provisional application No. 60/340,033, filed on Nov. 30, 2001, provisional application No. 60/340,065, filed on Nov. 30, 2001.

(51) Int. Cl.
*H01F 1/37* (2006.01)

(52) U.S. Cl. .................. 252/62.54; 524/505; 524/431; 525/245; 525/246; 525/289; 525/290

(58) Field of Classification Search ............ 252/62.54; 524/505, 431, 245, 246, 289, 290
See application file for complete search history.

(56) References Cited

OTHER PUBLICATIONS

Ahmed et al, sythesis and Charactersization of Block Copolymer-CoFe2O4 nanoclusters:Parameters Influencing the Magnetic Properties of the Nanocomposite. Abstracts of papers presented at 220th ACS National meeting, Aug. 20-24, 2000.*

* cited by examiner

*Primary Examiner*—C. Melissa Koslow
(74) *Attorney, Agent, or Firm*—Rosenberg, Klein & Lee

(57) ABSTRACT

A method of room temperature synthesis of magnetic metal oxide nanoclusters within a diblock copolymer matrix includes the step of synthesizing, by ring opening metathesis polymerization technique, a diblock copolymer having a repeat unit ratio m/n, introducing, at room temperature, one or several metal containing precursors into the one block of the diblock copolymer, and processing the metal containing diblock copolymer by wet chemical technique to form nanoclusters of the metal(s) oxide within the diblock copolymer matrix. Specific reaction for synthesis of $CoFe_3O_4$ and $Co_3O_4$ nanoclusters within diblock copolymers, such as $[NOR]_m/[NORCOOH]_n$ and $[NOR]_m/[CO(bTAN)]_n$, respectively is used in the method of the present invention.

27 Claims, 17 Drawing Sheets

TEM OF $[NOR]_{400}[NORCOOH]_{50}$-$CoFe_2O_4$ NANOPARTICLES

SYNTHESIS OF NORBORNENE-COBALT MONOMER

CONTROLLED ROOM TEMPERATURE SYNTHESIS OF MAGNETIC METAL OXIDE NANOCLUSTERS WITHIN A DIBLOCK COPOLYMER MATRIX

REFERENCE TO RELATED APPLICATIONS

The present Utility Patent Application is based on Provisional Patent Application No. 60/340,033, filed 30 Nov. 2001, and Provisional Patent Application No. 60/340,065, filed 30 Nov. 2001.

This invention was made with Government support and funding from NSF Contract No. CTS 9875001. The Government has certain rights in this invention.

FIELD OF THE INVENTION

The present invention relates to nanocluster fabrication; and more particularly to the development of self-assembled magnetic metal oxide nanoclusters within a diblock copolymer matrix.

Further, the present invention relates to synthesis of magnetic $CoFe_2O_4$ nanoparticles within a diblock copolymer matrix.

Still further, the present invention pertains to the development of ferromagnetic $Co_3O_4$ nanoparticles within a diblock copolymer matrix.

Furthermore, in a more detailed concept thereof, the present invention is directed to the room temperature synthesis of metal oxide containing nanocomposite achieved by incorporating metal(s) oxide into self-assembled nanodomains of diblock copolymers having a predetermined repeat unit ratio for each block which are synthesized by the technique of ring opening metathesis polymerization in the presence of a catalyst.

BACKGROUND OF THE INVENTION

Nanocrystalline materials are nano composites characterized by an ultrafine grain size (less than 50 nm). Nanoclusters are the subject of current interest due to their unusual optical, electronic, and magnetic properties which often differ from their bulk properties. The spatial confinement of electronic and vibrational excitations in nanoclusters result in a widening of the energy band gap and observation of quantum size effects. Quantum size effects and large surface to volume ratios can contribute to the unique properties of nanoclusters, which for example include a phenomena that when below a critical size the magnetic particles become a single magnetic domain and are superparamagnetic.

Although nanoclusters have received attention from both theoretical and experimental standpoints, the greatest challenge at the present time is to find out an effective synthesis procedure. The fundamental challenges in nanostructured materials include: ability to control the scale of the nanostructured system; ability to obtain the required composition with the controlled effects, concentration gradients, etc.; understanding the influence of the size of building blocks in nanostructured materials, as well as the influence of microstructure of the physical, chemical, and mechanical properties of this material; and transfer of developed technologies into industrial applications including the development of the industrial scale of synthesis methods of nanomaterials and nanostructured systems.

A number of methods of nanocluster fabrication have been developed which include Radio frequency plasma torch synthesis of $\gamma$-FeNx nanoclusters have been reported by Z. Turgut, et al. of Carnegie Mellon University. In their approach, a plasma gas mixture of argon and hydrogen were used as a sheath gas. Micron sized iron particles were injected into the plasma stream using argon as a carrier gas. Ammonia was used as a nitrogenization source. By controlling the injection rate, a mixture of 27 nm FeNx and 55 nm Fe powder was achieved.

Graphite encapsulated metal nanoclusters were reported to be synthesized by D. Lynn Johnson, et al. of Northwestern University using high temperature electric arc technique. Carbon and metals of interests were co-evaporated by producing an electric arc between a tungsten cathode and a graphite/metal composite anode. The encapsulation occurred in-situ. The powdered material collected consisted of GEM and bare metal nanocrystal as well as amorphous carbon particles.

PbS and CdS colloids of nanometer dimension have been reported to be synthesized by controlled precipitation of the metal sulfide in water and acetonitrile solution (H. J. Watzke, et al., Journal of Physical Chemistry, 91, 854, 1987). Although these colloids have shown quantum sized effects, they have a broad size distribution. Synthesis of nanoclusters other than CdS and ZnS has thus far been substantially unsuccessful.

CdS nanoclusters have been synthesized within the pore structure of the zeolite (Y. Wang, et al., Journal of Physical Chemistry, 91, 257, 1987). The coordination of Cd atoms with the framework of oxygen atoms of the double six ring windows of zeolite leads to formation of stable nanoclusters with the structural geometry superimposed by the matrix.

Metal nanoclusters have been prepared by the solution phase thermolysis of molecular precursor compounds (J. G. Brennan, et al., Chemical Materials, 2, 403, 1990), such as $[Cd(SePh)_2]$2[Et2PCH2CH2PeT2].

Nanocluster of CdSe has been synthesized using organometallic reagents such as $Se(TMS)_2$ in inverse micellar solution (A. P. Alivisatos, et al., Journal of Physical Chemistry, 90, 3463, 1989). Arrested precipitation in reverse miscelles gives a bare semiconductor lattice and in situ molecular modification of the cluster surface enables isolation of the molecular product with a variety of organic surface ligands.

Gold nanoclusters have been fabricated using a metal vapor deposition technique (J. K. Klabunde, et al., Chemical Material, 1, 481, 1989). In this method, gold vapor was codeposited with liquid styrene or methyl methacrylate (as vapor) at liquid nitrogen temperature.

The first successful attempt to use block copolymer to fabricate metal nanoclusters is believed to have been accomplished by Morkned, et al. (Applied Physics Letters, 64, 422, 1994). In this method, metal vapor was deposited on the surface of a microphase separated PS-PMMA diblock copolymer. After deposition, the film was annealed under vacuum for twenty-four hours. The resulting nanoclusters had a narrow size distribution. The shape and size of the nanoclusters were additionally fine tunable.

Recently, research at MIT (R. T. Clay, et al., Supra Molecular Science, 4, 113, 1997) and at the University of Maryland, College Park have synthesized metal nanoclusters inside the microphase separated domains of diblock copolymer. The self-assembled nature of domain structures permits good control over the shape and size of nanoclusters. Polymer matrix also provides kinetic hindrance to aggregation of nanoclusters of larger particles. Nanoclusters within block copolymer show 3-D ordering and furthermore the density of nanoclusters are high enough for synthesizing non-linear devices for commercial applications.

Metal nanoclusters of Cu, Ag, Pd, Pt, and binary metal oxide nanoclusters of $Fe_2O_3$ and CuO have been synthesized within microphase separated domains of diblock copolymers [Y. N. G. Scheong Chan, et al., Chemical Material, 4, 1992, 24, Y. N. G. Scheong Chen, et al., Journal of American Chemical Society, 114, 1992, 7295, Y. N. G. Scheong Chen, et al., Chemical Materials, 4, 1992, 885, and B. H. Sohn, Chemical Materials, 9, 1997, 113]. The self-assembled nature of the micro-domains permits control over the shape and size of the nanoclusters. The interfaces between the blocks of the diblock copolymers play an important role in the nucleation and growth of clusters and induces a narrow size distribution. The polymer matrix additionally provides schematic hindrance to aggregation of nanoclusters.

Cobalt ferrite, $CoFe_2O_4$, is a well-known hard magnetic material with high cubic magneto-crystalline anisotropy, high coercivity and moderate saturation magnetization. It would be highly desirable to provide room temperature synthesis of mixed metal oxide nanoclusters within a polymer matrix for obtaining diblock copolymer-$CoFe_2O_4$ nanocomposites with the needed magnetic properties while only single metal incorporation within a block copolymer nanodomain has been reported thus far using similar techniques. It would also be highly desirable to have a novel way of associating the metal (Co and/or Fe) to the polymer in the liquid state. Moreover, the specific reaction scheme for $Co_3O_4$ nanocomposites, where the Co atoms are directly attached to the monomer during its polymerization, is also desirable for obtaining ferromagnetic nanoparticles within a diblock copolymer matrix.

SUMMARY OF THE INVENTION

It is therefore an object of the present invention to provide a method for controlled room temperature synthesis of magnetic $CoFe_2O_4$ nanoclusters within a diblock copolymer matrix.

It is another object of the present invention to provide a method for controlled room temperature synthesis of polymer $Co_3O_4$ nanocomposite within a diblock copolymer matrix.

It is still an object of the present invention to provide a method for synthesis of self-assembled magnetic $CoFe_2O_4$ or $Co_3O_4$ nanoparticles at room temperature using a microphase separated diblock copolymer as a template. In this method, diblock copolymers are synthesized using ring opening metathesis polymerization with a predefined repeat unit ratio for each block. In this manner, the self-assembly of the $CoFe_2O_4$ mixed metal oxide magnetic nanoparticles, or $Co_3O_4$ nanocomposite takes place within the spherical microphase separated morphology of the diblock copolymer which serves as the templating medium. The self-assembly of the magnetic metal(s) oxide within the diblock copolymer matrix is achieved at room temperature by introducing metal(s) containing precursor(s) into one of the polymer blocks and by subsequent processing of the copolymer by wet chemical methods to substitute the chlorine atoms with oxygen.

The present invention is a method of room temperature synthesis of magnetic metal oxide nanoclusters within a diblock copolymer matrix which includes the steps of:

(a) synthesizing through a ring opening metathesis polymerization technique, a diblock copolymer which includes a first polymer block and a second polymer block, with both blocks being of predetermined "length", such that a resulting diblock copolymer has a predetermined repeat unit ratio m/n of the first and second polymer blocks, respectively;

(b) introducing at room temperature, one or more precursors, which are salts of one or several metals, into one block of the diblock copolymer (prior or after the formation of the diblock copolymer), thus forming a copolymer with the metal or metals attached to one of the polymer blocks in the diblock copolymer; and (c) processing the resulting metal(s) containing diblock copolymer by a wet chemical technique to form single metal or multi-metal oxide nanoclusters within the diblock copolymer matrix.

The repeat unit ratio m/n may be changed either by increasing or decreasing the rate of polymerization, or by increasing and decreasing the time period the polymerization takes place.

The method of the present invention may be used for synthesis of different metal oxide nanoclusters in different diblock copolymers. For example, for synthesis of $CoFe_2O_4$ nanoclusters, the method contemplates the steps of:

ring opening metathesis polymerization of norbornene (NOR) and norbornene trimethylsilane (NORCOOTMS) in presence of a catalyst, preferably Grubb's catalyst, to form a $[NOR]_m/[NORCOOTMS]_n$ diblock polymer;

converting the $[NOR]_m/[NORCOOTMS]_n$ diblock copolymer into $[NOR]_m/[NORCOOH]_n$ diblock copolymer by precipitating the obtained in the previous step diblock polymer in a mixture of methanol, acetic acid and water;

introducing $FeCl_3$ and $CoCl_2$ precursors into the diblock copolymer, so that $FeCl_3$ and $CoCl_2$ molecules attach themselves to the NORCOOH block;

forming solid films of the mixture of diblock copolymer, $FeCl_3$ and $CoCl_2$; and washing the solid films with NaOH and water, thus forming $CoFe_2O_4$ nanoclusters within the $[NOR]_m/[NORCOOH]_n$ diblock copolymer matrix.

In the step of ring opening metathesis polymerization of a diblock copolymer, it is contemplated, that either first the step of polymerization of norbornene molecules is initiated by introducing a catalyst solution to the solution of norbornene (NOR) in THF (anhydrous tetrahydrofuran) and the molecules of NORCOOTMS are added to the norbornene polymer. Alternatively, the polymer molecule of NORCOOTMS is formed first by adding the Grubb's catalyst solution to the solution of NORCOOTMS in THF, and the norbornene (NOR) molecules are added to the NORCOOTMS afterwards. The major requirement for the stage of polymerization of diblock copolymer is to permit sufficient time for polymerization of both polymolecules of the diblock copolymer in order to achieve a predetermined repeat unit ratio m/n. Although different m/n ratios are contemplated in the subject method it is preferred that m/n=400:50.

The introduction of the Fe and Co salts into the diblock copolymer takes place in liquid phase. This facilitates the uniform distribution of metal containing nanoclusters in the diblock copolymer matrix as opposed to solid phase doping techniques. The method of the present invention permits the attainment of a highly uniform doping of the nanocluster system. Such a uniformity of nanoclusters incorporated into the diblock copolymer matrix is important for the application of the nanostructures as data storage where the isolation of nanoclusters from each other, as well as the uniform separation between adjacent nanoclusters within the diblock copolymer matrix is of essence for proper operation of such information storage.

After complete polymerization of the diblock copolymer is accomplished (when the repeat unit ratio m/n is achieved), the process of polymerization is terminated, preferably by adding an unsaturated ether which cleaves the molecules of catalyst from the polymer chain thus deactivating the polymerization.

The method of the present invention further contemplates a room temperature synthesis of $Co_3O_4$ nanoclusters within a diblock copolymer matrix, which includes the steps of:

- synthesis of Co(bTAN) by mixing a solution of $CoCl_2$ in tetrahydrofuran and a solution of $Li_2$(bTAN) which is lithium-trans-2,3-bis (tert-butylamidomethyl) norborn-5-ene in ether;
- ring opening metathesis polymerization of norbornene (NOR) and the Co(bTAN) in presence of a catalyst to form $[NOR]_m/[Co(bTAN)]_n$ diblock copolymer;
- forming solid films of said $[NOR]_m/[Co(bTAN)]_n$ diblock copolymer; and
- washing the solid films with hydrogen peroxide $H_2O_2$, thus forming $Co_3O_4$ nanoclusters within the $[NOR]_m/[Co(bTAN)]_n$ diblock copolymer matrix.

Prior to introducing of $CoCl_2$ into the $Li_2$(bTAN), the $CoCl_3$ is dissolved in tetrahydrofuran, so that attachment of metal containing molecules to the $Li_2$(bTAN) is achieved directly in the liquid phase thus greatly improving the uniformity of distribution of metal containing nanoclusters within the diblock copolymer matrix.

The polymerization of the $[NOR]_m/[Co(bTAN)]_n$ diblock copolymer is initiated by adding the Grubb's catalyst to the solution of the norbornene (NOR) in benzene. Further, the C(bTAN) is added to the NOR polymer solution after approximately 15 minutes from the introduction of the Grubb's catalyst to form a resultant diblock copolymer $[NOR]_m/[Co(bTAN)]_n$.

The resultant diblock copolymer is further precipitated in pentane and the precipitated diblock copolymer is dried and dissolved in benzene.

The solution of the precipitated diblock copolymer in benzene is further statically cast to form solid films of the diblock copolymer containing atoms of cobalt over a period of approximately 240 hours, and the solid films are further washed with hydrogen peroxide for a period of approximately 24 hours to form $Co_3O_4$ nanoparticles within $[NOR]_m/[Co(bTAN)]_n$ diblock copolymer matrix.

These and other novel features and advantages of this invention will be fully understood from the following detailed description of the accompanying Drawings.

DETAILED DESCRIPTION OF THE PREFERRED EMBODIMENTS

The present invention is a process of controlled room temperature synthesis of self-assembled magnetic metal(s) oxide nanoparticles within the diblock copolymer matrix. The method of the present invention uses a microphase separated diblock copolymer as a template for the formation of nanostructures, such as a single metal oxide or a multi-metal oxide. For both types of resulting product (single or multi-metal oxide nanostructures), metal(s) atoms may either be introduced to one block of a diblock copolymer as a salt when the polymer is dissolved, or to one monomer prior to the polymer synthesis. However, despite the differences in these two approaches, the overall method of room temperature synthesis of magnetic metal oxide nanoclusters within a diblock copolymer matrix of the present invention includes the following steps:

- synthesizing by a ring opening metathesis polymerization technique, a diblock copolymer which includes a first polymer block and a second polymer block having a predetermined repeat unit ratio m/n of the first and second polymer blocks, respectively,
- introducing at room temperature in a liquid phase, metal or metals into one of the blocks of the diblock copolymer (prior or after polymerization of the diblock copolymer), and
- processing the metal (or metals) containing diblock copolymer by wet chemical technique to form nanoclusters of the metal (or metals) oxide within the diblock copolymer matrix.

The following description of the method of the present invention will be further presented with regard to synthesis of magnetic $CoFe_2O_4$ nanoclusters and $Co_3O_4$ nanoclusters, although it will be readily apparent to a person skilled in the art that the principles and teachings of the method of the present invention are applicable to the templating of nanostructures of many other metals and semiconductors within diblock copolymer nanodomains for synthesis of metal(s) oxide magnetic nanoclusters within diblock copolymer matrices.

Figure 1:
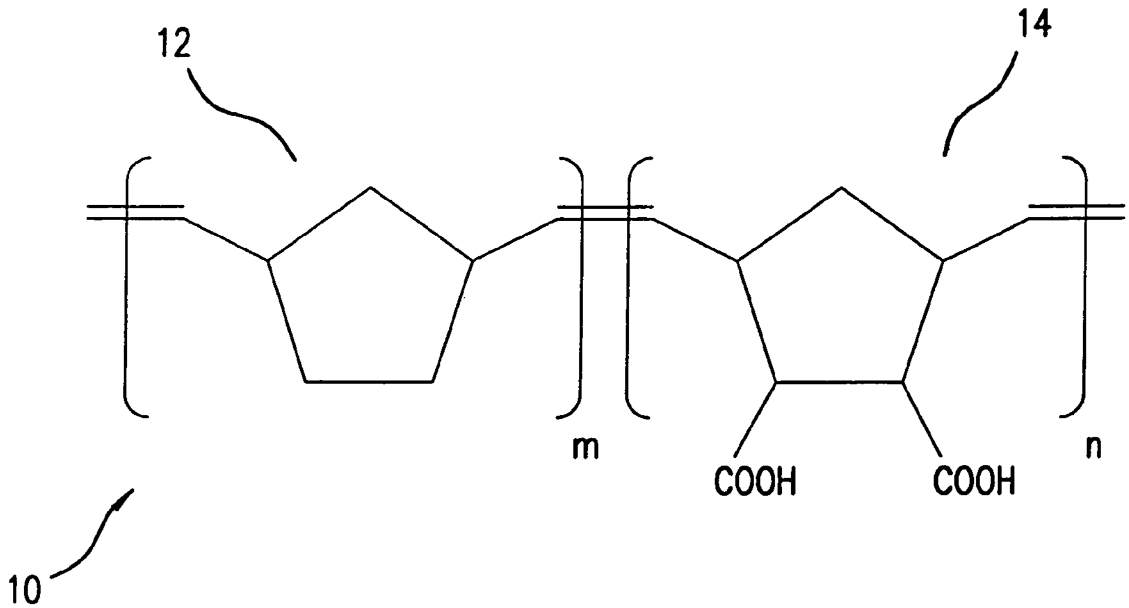
FIG. 1 shows a structure of the poly(norbornene)-poly (norbornene-dicarboxylic acid) diblock copolymer.
Figure 2:
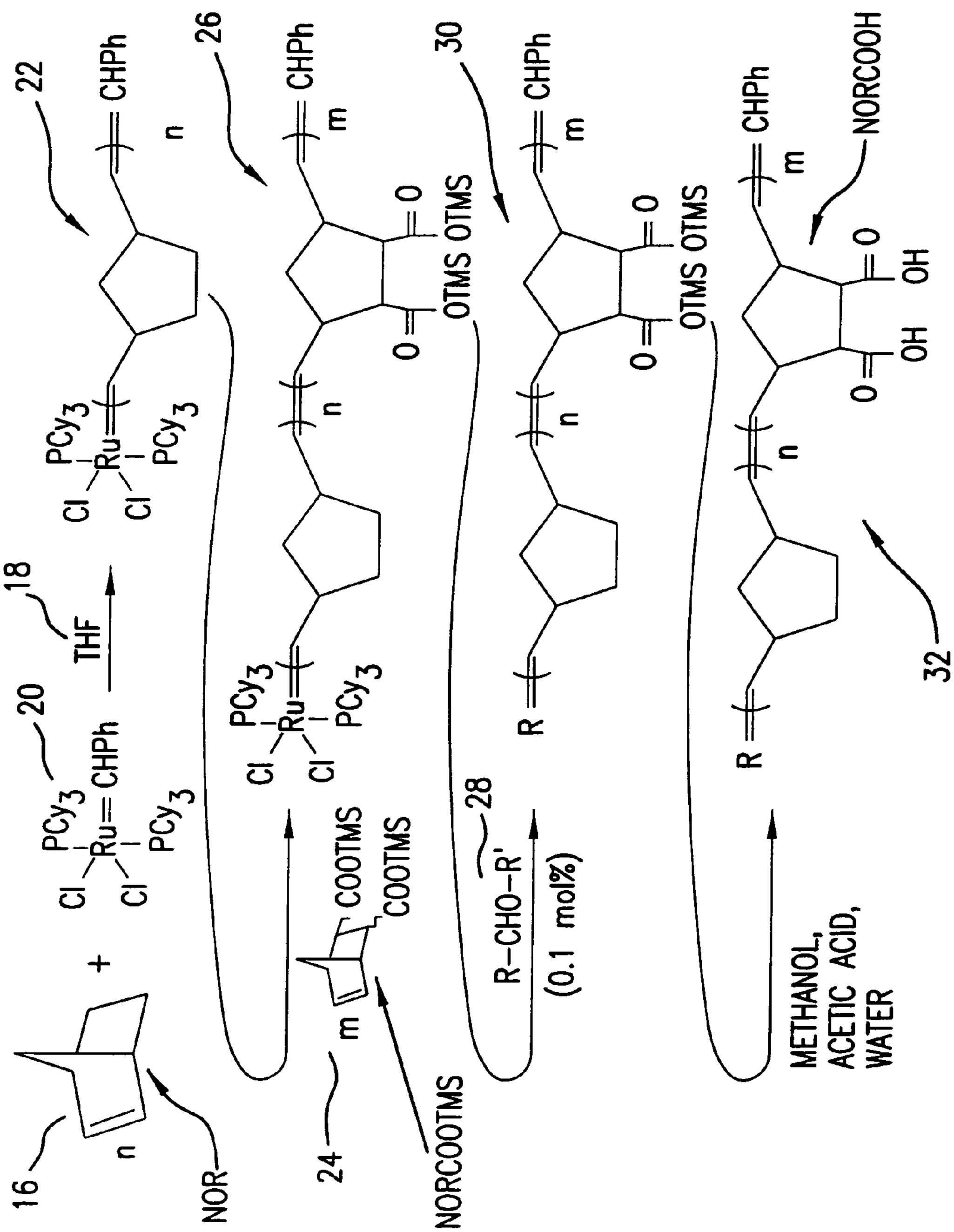
FIG. 2 shows the synthesis of the $[NOR]_m/[NORCOOH]_n$ diblock copolymer.
Figure 3:
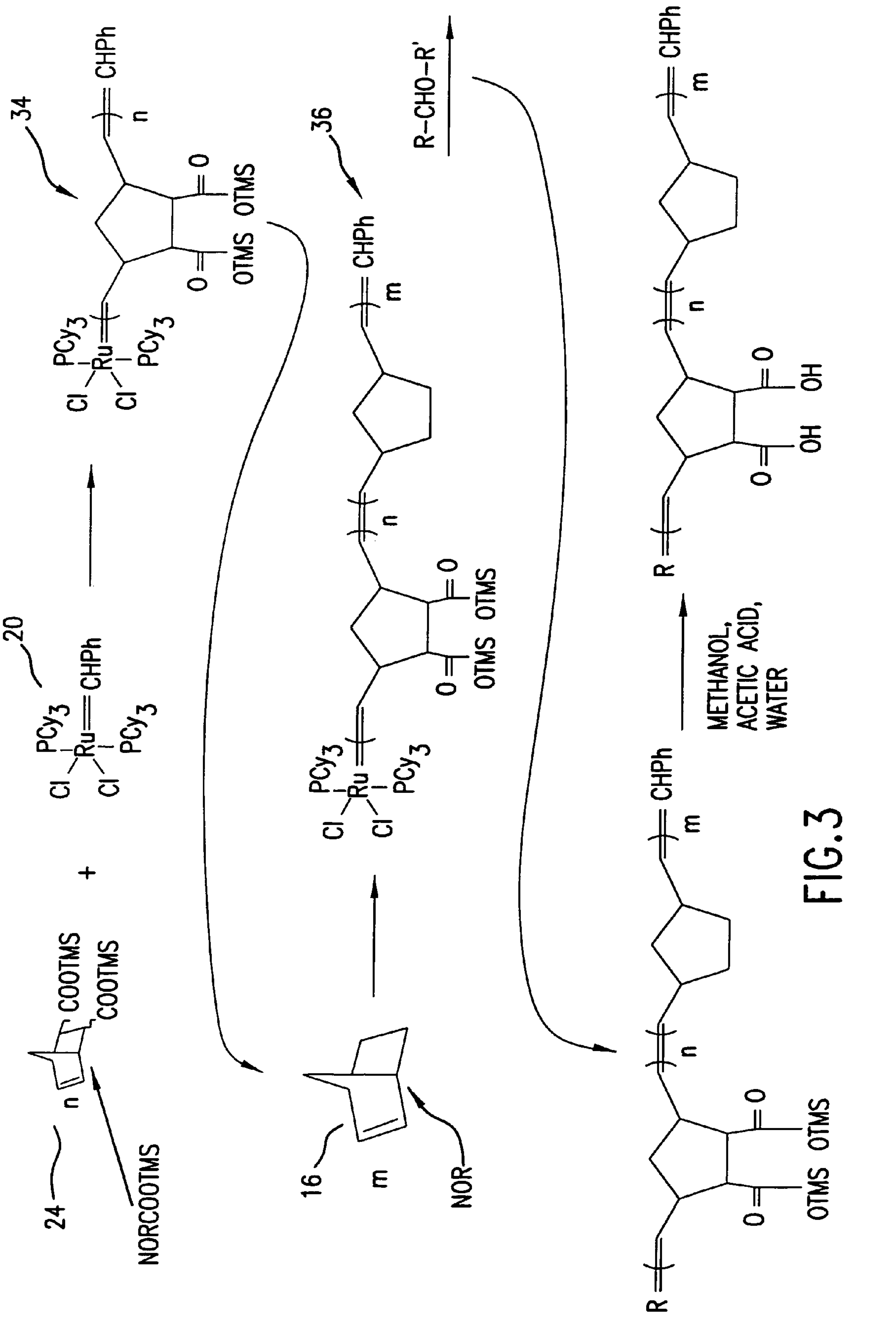
FIG. 3 shows an alternative technique for diblock copolymer synthesis.

As such, for the synthesis of $CoFe_2O_4$ nanoclusters, diblock copolymers 10 shown in FIG. 1 consisting of a block of poly-norbornene (NOR) 12 and poly(norbornene-dicarboxcylic acid), also referred to herein as NORCOOH, block 14 was synthesized using ring opening metathesis polymerization presented in further detail in following paragraphs with regard to FIGS. 2 and 3, with a repeat unit ratio m/n for each block. The self-assembly of the $CoFe_2O_4$ mixed metal oxide magnetic nanoparticles takes place within the spherical microphase separated morphology of the diblock copolymer 10 which serves as the templating medium. The self-assembly of the magnetic oxide within the diblock copolymer matrix is achieved at room temperature in the liquid phase by introducing $FeCl_3$ and $CoCl_2$ precursors into the second polymer block (NORCOOH) 14 and by the subsequent processing of the copolymer by wet chemical methods to substitute the chlorine atoms with oxygen.

The diblock copolymer $[NOR]_m/[NORCOOH]_n$ 10 is synthesized by two techniques, shown respectively in FIGS. 2 and 3, however, norbornene (NOR) and norbornene trimethylsilane (NORCOOTMS) were used as the initial materials in both techniques.

Referring to FIG. 2, showing the first technique of the diblock copolymer synthesis, the diblock copolymer synthesis begins with preparation of 4% solution of norbornene (NOR) 16 in anhydrous tetrahydrofuran (THF) 18 by dissolving one gram NOR ($5.5\times10^{-3}$ mol 400 equivalent) in 25 ml THF. The polymerization of the norbornene (NOR) was initiated by adding 0.75 ml ($13.75\times10^{-6}$ mol, 1/400 equivalent) of Grubbs catalyst solution 20. The Grubb's catalyst (BIS(tricyclohexylphosphin)benzylidine ruthenium(IV) dichloride) is a catalyst purchased from Sterm Chemicals the stock solution (30 mg/ml) of which was prepared by dissolving the catalyst in THF and $CH_2Cl_2$. The Grubb's catalyst has high tolerance towards impurities and hence enables the use of commercially available norbornene without further purification. Thus, as can be seen in FIG. 2, the initial norbornene 16 dissolved in THF 18 is polymerized by means of Grubb's catalyst reaction with the norbornene to form a polymolecule 22 containing n open ring norbornene molecules. After approximately an hour since initiating of the polymerization of norbornene, NORCOOTMS solution 24 (2-NORBORNENE-5,6,-dicarboxylic acid BIS trimethylsilyl ether which had $44\times10^{-3}$ mol, 50 equivalent) is added to the living polymer solution 22 to form a molecule 26 including N polymolecules 22 and M polymolecules 26, which, as can be seen in FIG. 2, included the molecule of the Grubb's catalyst.

The reaction of polymerization was terminated after 24 hours by addition of unsaturated ether 28 which cleaves the catalyst from the chain molecule 26 and leaves the resultant $[NOR]_m/[NORCOOTMS]_n$ diblock 30. The diblock 30 is further precipitated in a mixture of methanol, acetic acid and water (4:25:50) to result in $[NOR]_m/[NORCOOH]_n$ diblock copolymer 32 which is dried under vacuum before the further processing.

Referring to FIG. 3, in the synthesis of nanoclusters in the diblock copolymer, the sequence of monomer addition has been-changed. In the alternative embodiment, norbornene dicarboxylic acid trimethylsilyl ester is added as the first block to control the polydispersity. In order to control the polydispersity of the block copolymer, the bulkier 2-norbornene-5,6,-discarboxylic acid bis trimethylsilyl ester (NORCOOTMS) 24 is the first monomer to be polymerized.

The steric interference between the NORCOOTMS monomers and inhibition of Grubb's catalyst controls the rate of propagation of NORCOOTMS. This results in a controlled polymerization, with a narrow polydispersity index. When norbornene, which by itself cannot be homopolymerized with a narrow polydispersity index, is added to the propagating species, the resulting block copolymers has a polydispersity index less than 1.26. This study has shown that the polydispersity index can be controlled by selecting a monomer with proper functionality as the starting block of the block copolymer to control rate of propagation as an alternative of using additives to change the reactivity of the catalyst. Selection of the proper functionality depends on the polarity and bulkiness of the functional group to interact with the catalyst.

Referring to FIG. 3, showing the alternative process of creating the $[NOR]_m/[NORCOOH]_n$ diblock copolymer, the process begins with the initial NORCOOTMS 24, the polymerization of which starts with adding Grubb's catalyst 20 to form a chain 34 containing n molecules of NORCOOTMS with the catalyst attached to the chain. Norbornene 16 is further added to the chain 34 and the process of copolymerization continues for a number of hours to allow for complete polymerization and formation of the chain 36 of m norbornene molecules and n NORCOOTMS molecules with the Grubb's catalyst attached to such diblock chain 36. The reaction of polymerization further is terminated by adding unsaturated ether which cleaves the molecule of catalyst from the chain 36, thus leaving the resultant molecule $[NOR]_m/[NORCOOTMS]_n$, which is further converted to $[NOR]_m/[NORCOOH]_n$ by precipitating the polymer solution 30 in a mixture of methanol, acetic acid and water, similar to the process shown in FIG. 2. The polymers are dried under vacuum before static film casting.

Figure 4:
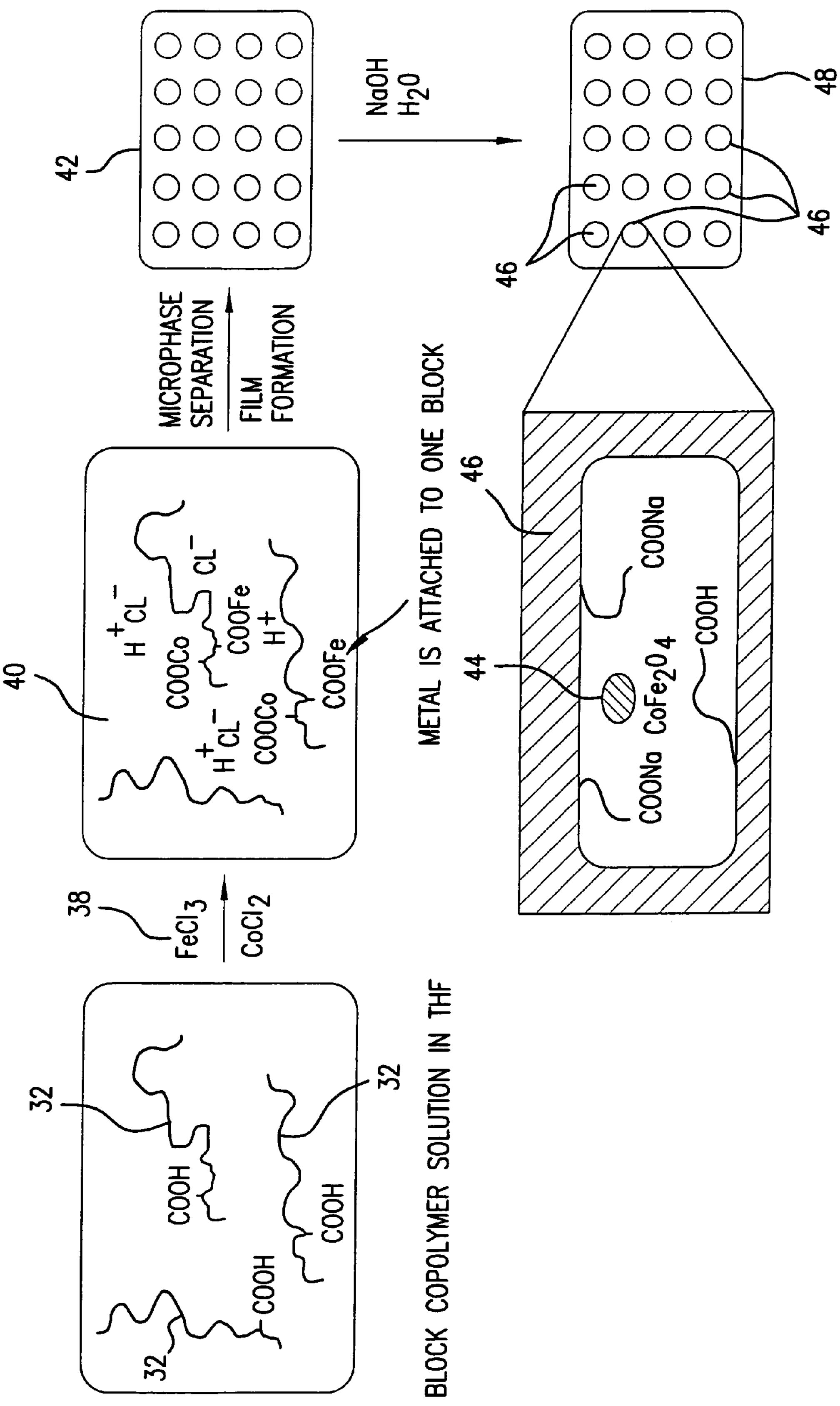
FIG. 4 presents schematically the room temperature wet chemical synthesis scheme for $CoFe_2O_4$ nanostructures.

Further, the $[NOR]_m/[NORCOOH]_n$ diblock copolymer created during the stage of polymer synthesis, is dissolved in THF, and, as shown in FIG. 4, $FeCl_3$ and $CoCl_2$ precursors 38 were mixed with the polymer solution in the following relationship: polymer:$FeCl_3$:$CoCl_2$=1:25.0:12.5 mole. Due to the high affinity of the Fe and Co towards the COOH group of the diblock copolymers 32, $FeCl_3$ and $CoCl_2$ are attached to the NORCOOH block of the diblock copolymer. From the solution 40, a polymer film may be static cast into a Teflon cup or it may be spin cast onto a substrate. Solid films 42 have been formed by static casting over a period of three days. The films 42 are then washed with NaOH and water. The molecules of $FeCl_3$ and $CoCl_2$ microphase separated within the film 42, reacts with NaOH and water within the NORCOOH nanoreactors and as a result, $CoFe_2O_4$ nanoclusters 44 are formed within the self-assembled NORCOOH nanospheres 46 of the diblock copolymer matrix 48.

Figure 5A:
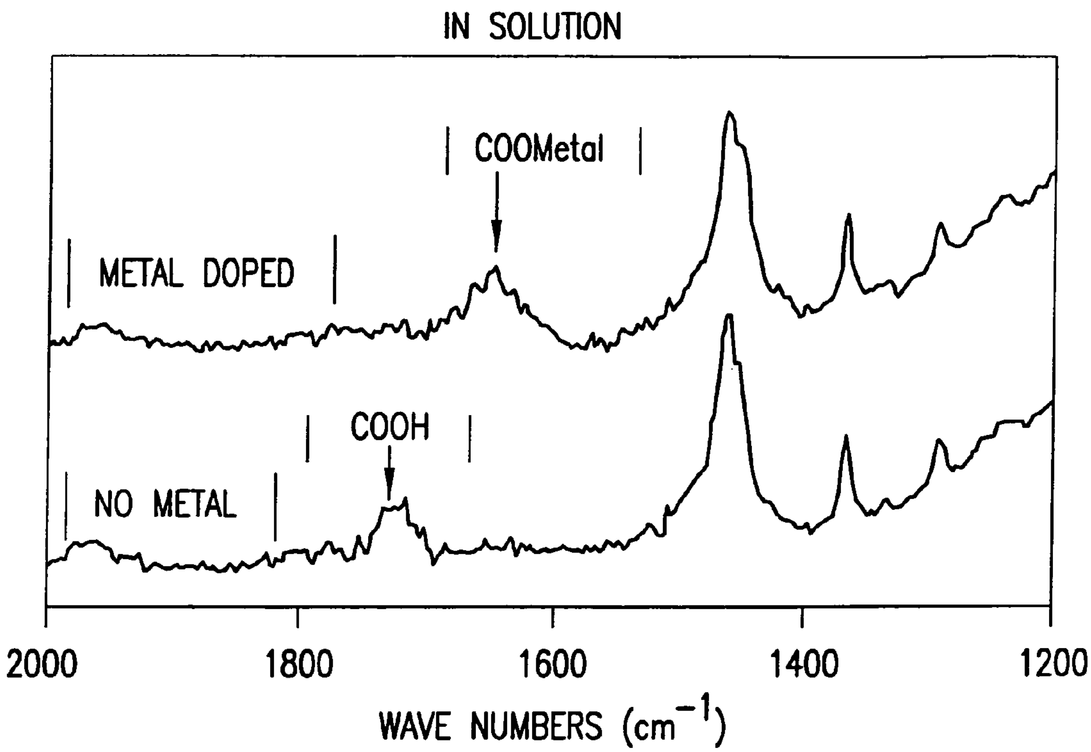
FIGS. 5A and 5B present results of the FTIR (Fourier Transform Infrared Spectroscopy) study of the nanocomposites in the copolymer solution and in the solid copolymer, respectively.
Figure 5B:
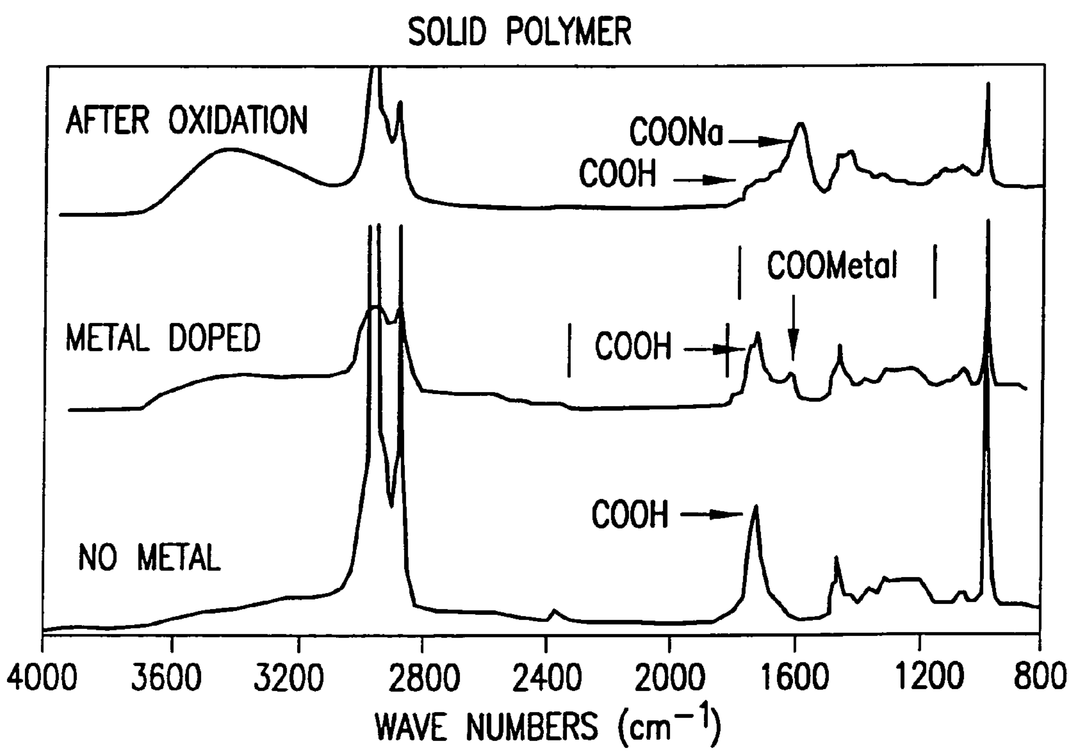

Static cast films are produced by slowly evaporating the solvent over three days, and then placed under vacuum to remove any residual solvent. Films are analyzed with X Fourier Transform Infrared Spectroscopy (FTIR) to verify the association of the metals to the carboxylic groups on the second block NORCOOH block 14 of the diblock copolymer 10, as shown in FIGS. 5A and 5B. The spectra, taken in the range of 4,000 to 800 $cm^{-1}$ on a Nicolet Fourier transform spectrometer show that the metals are selectively attached to COOH block (FIG. 5A). Partial metal disassociation from COOH block before oxidation, and complete disassociation of metal from the diblock copolymer after oxide formation is observed (FIG. 5B). FTIR presented in FIGS. 5A and 5B, verified that the metals are associated to the second block (NORCOOH) of the diblock copolymer 10 and not dispersed randomly as filler in the matrix.

A SQUID magnetrometer was employed to study the magnetic-properties of the $[NOR]_m/[NORCOOH]_m$—$CoFe_2O_4$ nanocomposites at an applied field up to 50KOE and at a temperature range from 300K to 4K. Morphology and microstructure of the nanocomposite films were determined using TEM (Transmission Electron Microscope) and $^{57}Fe$ Mossbauer spectroscopy.

The repeat unit ratio m/n of the NOR block 12 and NORCOOH block 14 of the diblock copolymer 10 was varied to form diblock copolymers with the following ratios of m/n: 400/50, 400/150, 400/200, and 400/250. For example, for m/n=400/50, the $CoFe_2O_4$ nanoclusters exhibited a uniformly dispersed spherical morphology within the polymer matrix with an average radius of 4.8±1.4 nm. The magnetic properties of the polymer films were dominated by surface effects. At room temperature, the nanocomposite films were found to be superparamagnetic and had a magnetization of 1.03 emu/g (equivalent to 18.04 emu/g of $CoFe_2O_4$). At 5K, the nanocomposite films become ferromagnetic with coercitivity=5.3KOE, equivalent remanence=11.93 emu/g and equivalent maximum magnetization=57.1 emu/g. The reduction in magnetization is due to the presence of a magnetically disordered surface layer of sequence approximately 5.5 angstrom.

Figure 6:
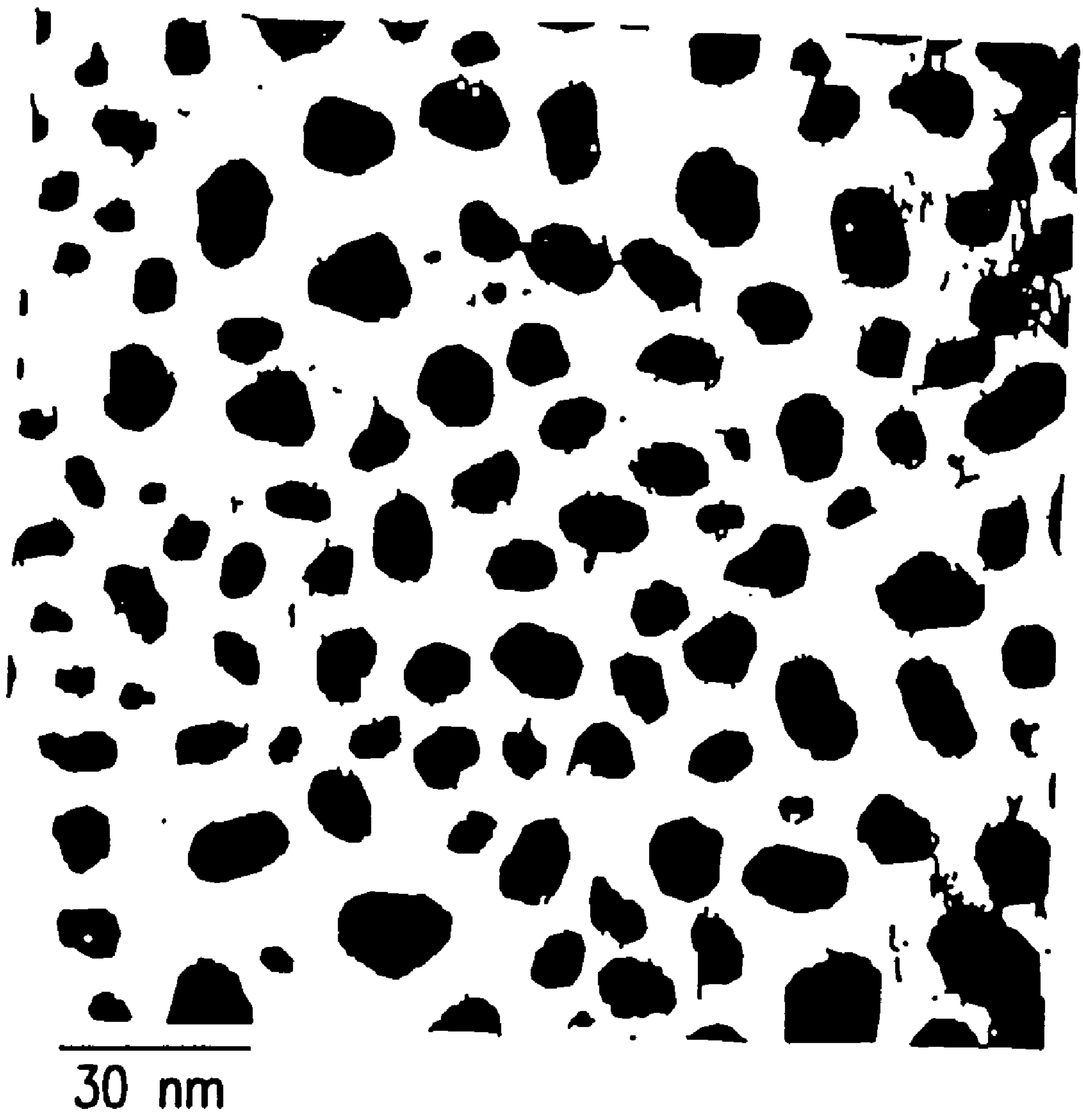
FIG. 6 is a representation of the image of the morphology of the diblock copolymer-$CoFe_2O_4$ nanocomposite obtained with a transmission electron microscope (TEM)

Referring to FIG. 6, the morphology of the $[NOR]_{400}/[NORCOOH]_{50}$—$CoFe_2O_4$ nanocomposites was studied using a Hitachi H-600 transmission electron microscope (TEM) operated at 100 KEV. Block copolymers were embedded in epoxy and ultra-thin (100 nm) samples for TEM observation were prepared with a diamond knife using a LKB Ultratome III model 8800. The samples were placed on a carbon coated nylon grid to reduce beam damage. The image obtained by the TEM technology, as shown in FIG. 6, indicates that the clusters have a relatively narrow size distribution, and are uniformly distributed within the polymer matrix. It is also seen from the image that the $CoFe_2O_4$ nanoclusters are almost spherical in shape and have an average radius of 4.8±1.4 nm.

Figure 7:
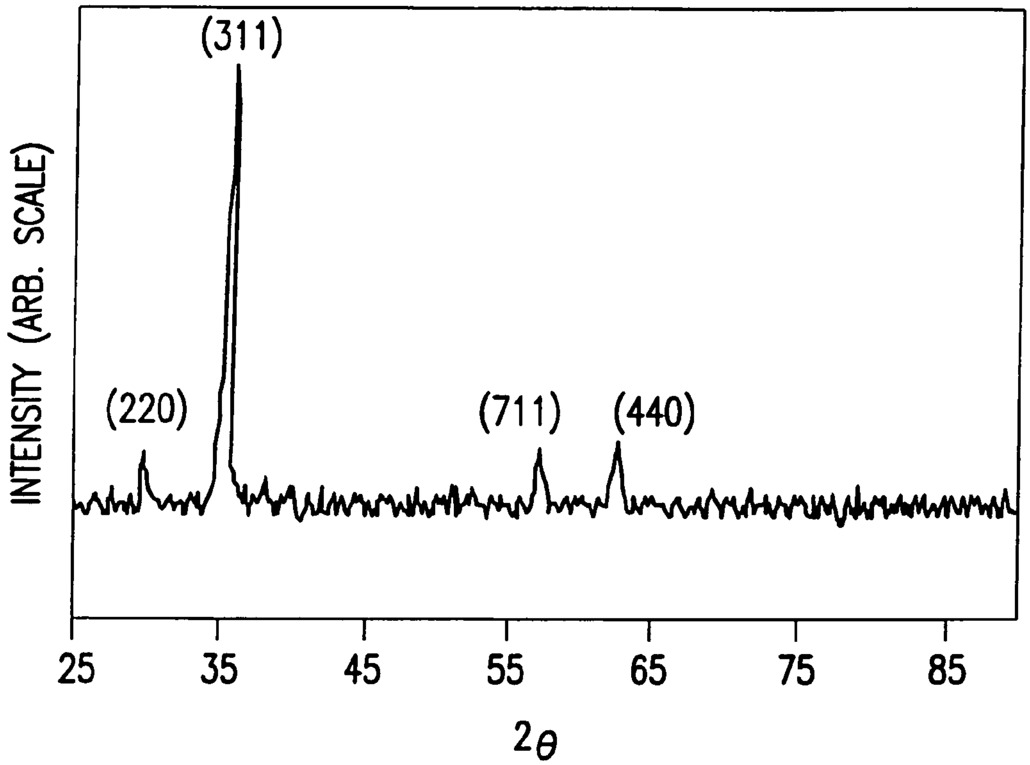
FIG. 7 is a diagram of intensity vs. angle obtained by wide angle X-ray of the nanoclusters within the diblock copolymer, confirming the $CoFe_2O_4$ nanocomposition formation.

The films of the $[NOR]_{400}/[NORORCOOH]_{50}$—$CoFe_2O_4$ were also analyzed with X-ray photo-electron spectroscopy to confirm $CoFe_2O_4$ formation. A Perkin Elmer 5800 XPS-Auger spectrometer was used to collect the spectra presented in FIG. 7. High resolution scan of the specific peaks of interest were obtained and the formation of $CoFe_2O_4$ was confirmed.

Figure 8:
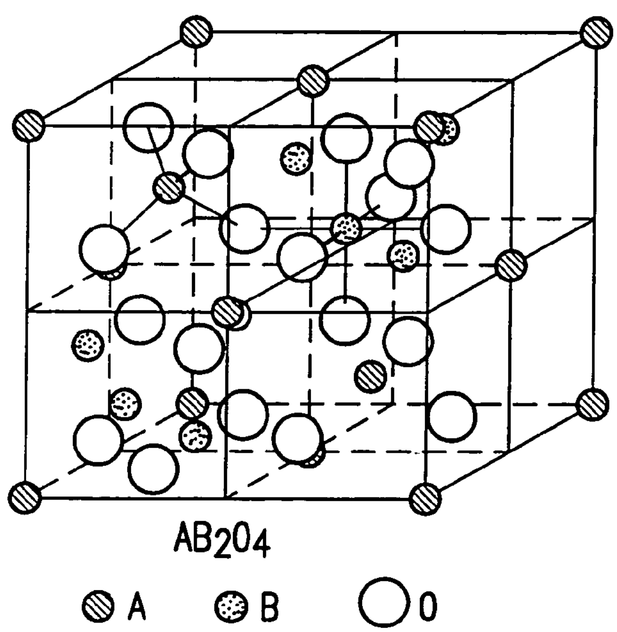
FIG. 8 is a representation of a structure of created $CoFe_2O_4$.

The Mossbauer spectra of the diblock copolymer films were obtained using a conventional constant acceleration Ranger Electronics Corporation Mossbauer spectrometer driven by a triangular waveform. The source was 25 $mCi^{57}Co$ in a Rh matrix maintained at room temperature. The spectrometer was calibrated with an iron foil. Spectral fits were performed assuming Lorentzian absorption line shapes. Sample temperatures were varied between 4.2 K and 300 K using a Superveritemp™ cryogenic dewar (Janis Research Corporation) configured with a Lakeshore, Inc. temperature controller. The magnetic structure of the $CoFe_2O_4$ nanoclusters was analyzed using Mossbauer spectroscopy. Bulk $CoFe_2O_4$ exhibits the inverse spinel structure shown in FIG. 8, with $Co^{2+}$ mostly at octahedral B sites and $Fe^{3+}$ almost equally distributed among tetrahedral A and octahedral B sites. Ferromagnetism in $CoFe_2O_4$ is due to the intra-lattice exchange interaction ($J_{AB}$ which is much greater than the inter-lattice interaction ($J_{BB}$). The magnetic moment of ions on B sites is aligned parallel to the direction of the net magnetization and anti-parallel to that of a site.

Figure 9:
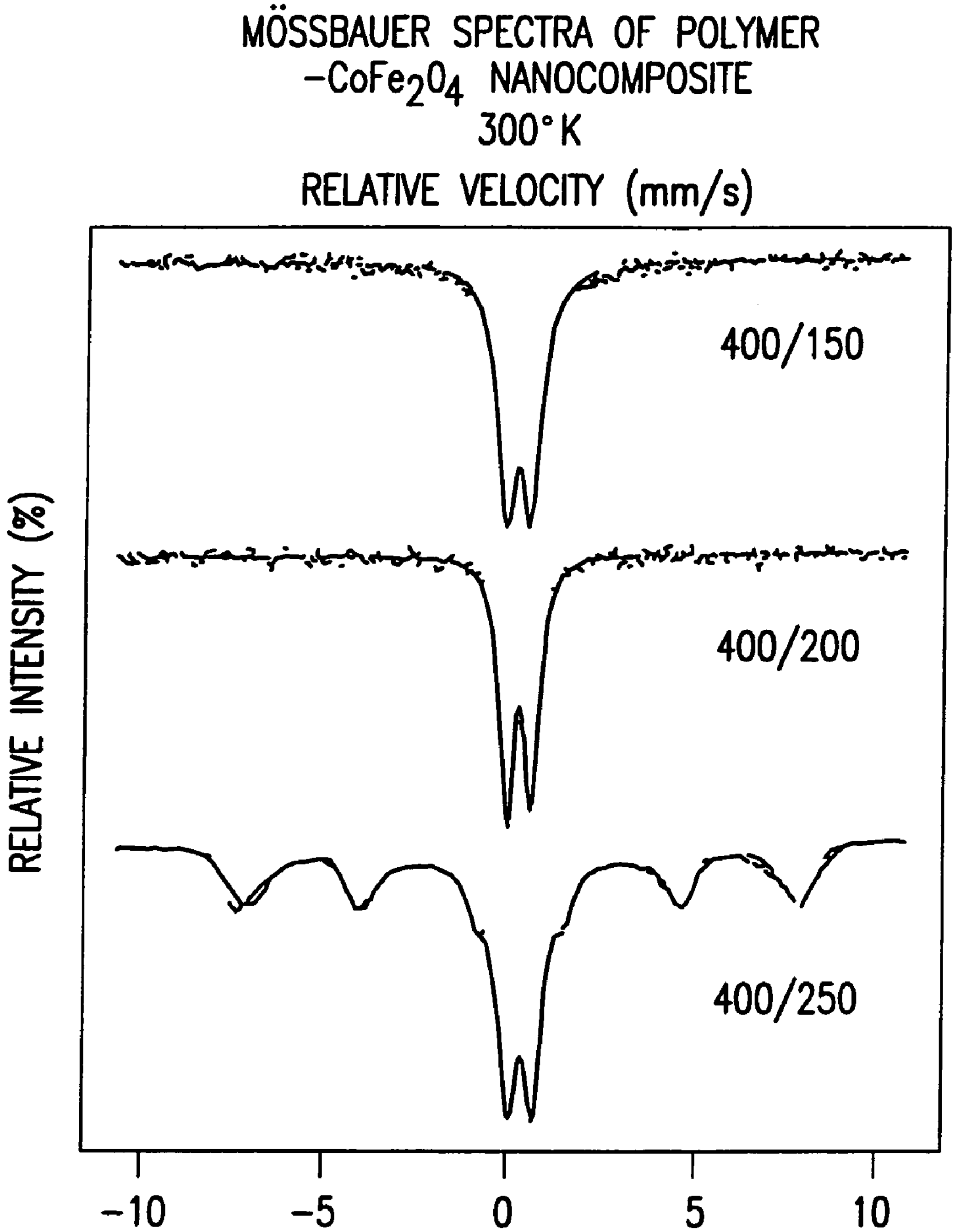
FIGS. 9–10 are Mossbauer Spectra of polymer-$CoFe_2O_4$ nanocomposite taken at 300° K and 4° K, respectively.
Figure 10:
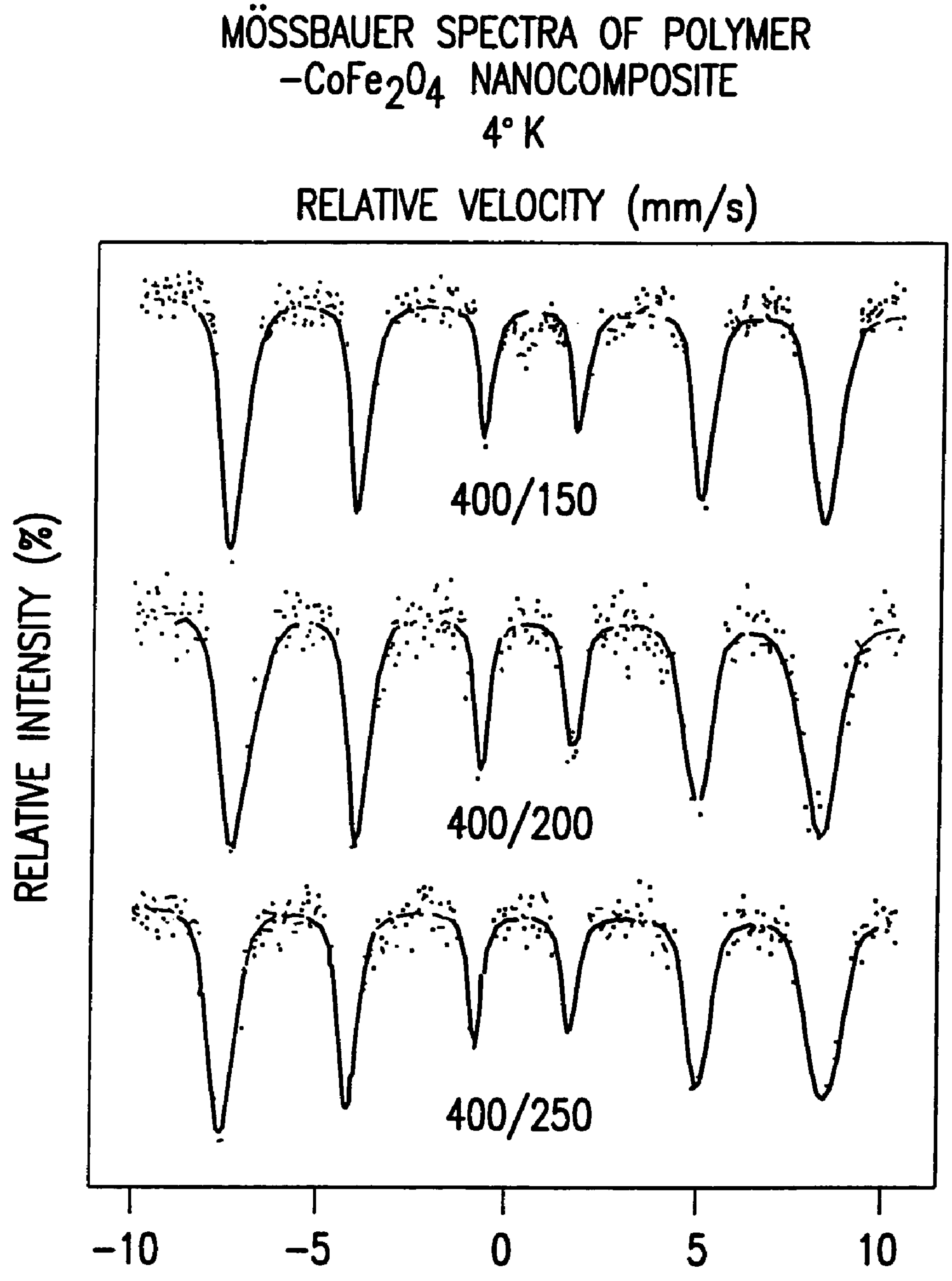
Figure 11:
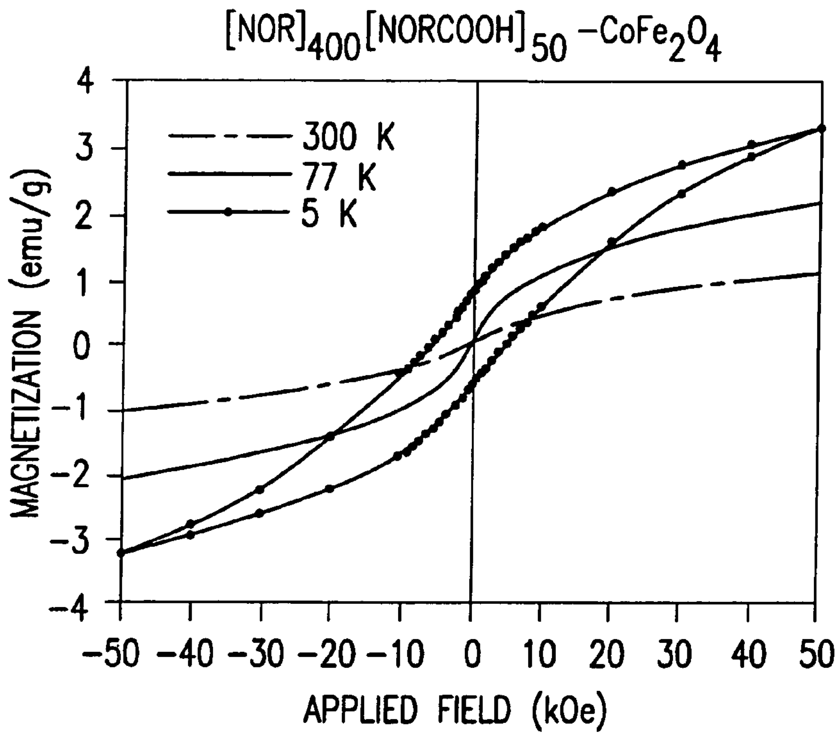
FIGS. 11–14 are diagrams representing magnetic properties of polymer-$CoFe_2O_4$ nanocomposite for diblock copolymers with different repeat unit ratios.
Figure 12:
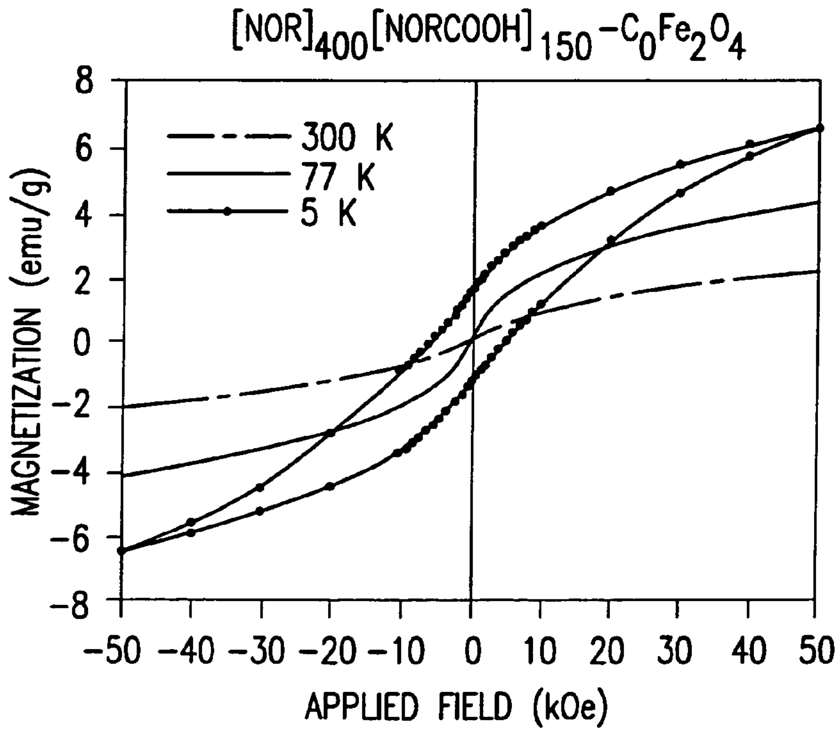
Figure 13:
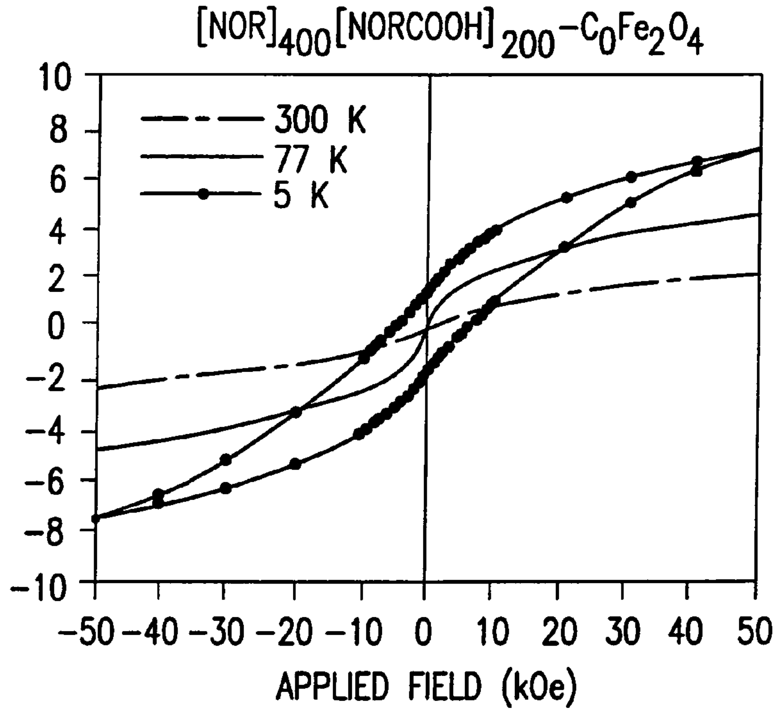
Figure 14:
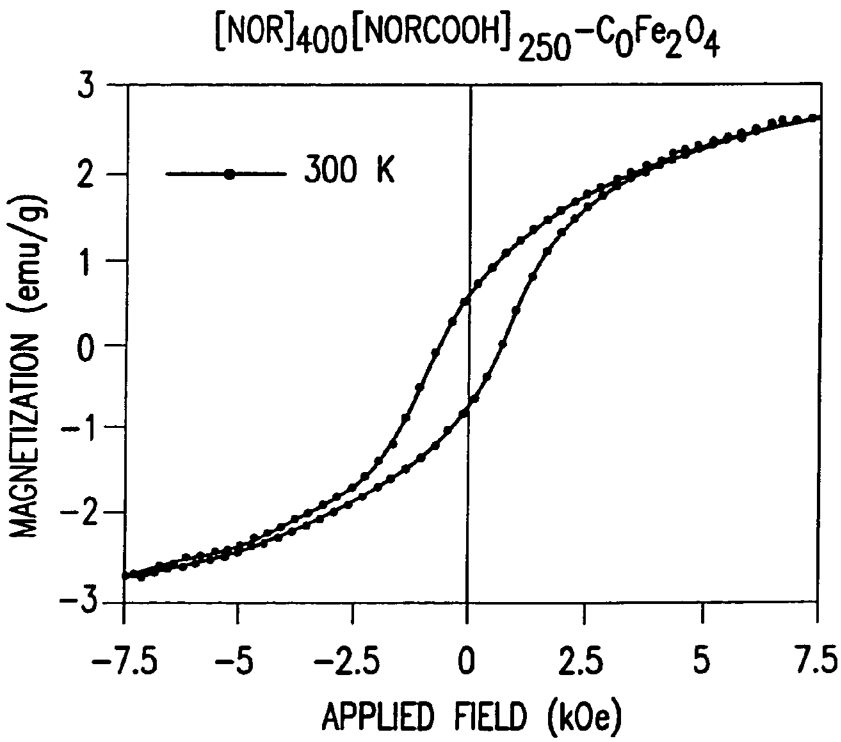

As shown in FIGS. 9 and 10, Mossbauer investigation of the $CoFe_2O_4$ diblock copolymer films were performed at 300 and 4.2 K for different repeat unit ratio m/n of the diblock copolymer. The room temperature spectra, shown in FIG. 9 are complex. They exhibit a quadrupolar component at the center of the spectrum and a magnetically split component spread across the spectrum. At room temperature, the quadruple splitting dominates the magnetic splitting and hence the sample is superparamagnetic. The intensity of the quadruple splitting decreases with the temperature. At 4.2 K, as shown in FIG. 10, only the magnetic splitting is present and the $CoFe_2O_4$ block copolymer is completely magnetic.

The room temperature and the 4.2° K spectra were analyzed further to investigate the magnetic hyperfine structure of $CoFe_2O_4$ nanoclusters. The slight asymmetry in the intensity of the absorption lines of the quadrupole doublet indicates the presence of two poorly resolved iron subsites. The presence of two iron subsites is further suggested by the fine structure observed in the magnetic spectral lines. These sites were attributed to iron ions at tetrahedral A and octahedral B sites of the spinel structure shown in FIG. 8. The experimental data shown in FIG. 9 were fit to the superposition of two doublets and two magnetic sextets, and the data shown in FIG. 10 were fit to the superposition of two magnetic sextets. Table 1 presents the Mossbauer parameters obtained from least square fits of the spectra. Smaller isomer shifts and hyperfine fields are associated with tetrahedral sites, while larger isomer shifts and hyperfine fields are characteristic of octahedral sites B.

TABLE 1

MOSSBAUER PARAMETERS FOR DIBLOCK COPOLYMER-$COFE_2O_4$

| T(K) | Isomer shift* (mm/sec) | $E_Q$ (mm/sec) | $H_{hf}$ | Fe(A)/Fe(B) |
|---|---|---|---|---|
| 300 | 0.27 | 0.72 | — | 0.59 |
| | 0.42 | 0.67 | — | |
| | 0.27 | — | 440 | 0.68 |
| | 0.41 | — | 447 | |
| 4.2 | 0.39 | — | 501 | 0.73 |
| | 0.53 | — | 526 | |

*Isomer shifts are relative to metallic Fe at room temperature

The observation of a quadrupole splitting in the paramagnetic component is indicative of ligand coordination distortion away from perfect tetrahedral or octhedral symmetry, $E_Q(A)$=0.72 mm/sec and $E_Q(B)$=0.67 mm/sec. The absence of an observable quadrupole splitting perturbation on the magnetic spectra indicates that the distortion is not along the same crystallographic axis relative to the direction of magnetization in various particles. In such a case, the presence of distortion would only contribute to line broadening of the magnetic spectra. This is expected in the case of small particles where large strains at the particle/support interface are known to produce severe lattice distortion. The spectral features observed at 4.2° K are consistent with those previously reported for $CoFe_2O_4$ particles by other Mossbauer investigations.

Bulk cobalt ferrite is known to exhibit a partially inverse spinel having the formula $(Co_xFe_{1-x}[CO_{1-x}Fe_{1+x}]O_4)$, where the parenthesis indicate tetrahedral A sites and the brackets indicate octahedral B sites. The degree of inversion measured by the ratio of iron ions in A to B crystallographic sites has been shown to be sensitive to heat treatment of the sample. It has been reported that Fe(A)/Fe(B)=0.61 for quenched samples and Fe(A)/Fe(B)=0.87 for slowly cooled samples.

In Mossbauer spectroscopy the ratio of iron ions in A and B subsites is estimated from the ratio of the absorption areas under the A and B subcomponents of the spectrum assuming that the recoil-free fraction for iron nuclei in tetrahedral and octahedral site symmetries is the same. For the created sample, the ratio of iron ions in A and B subsites observed at room temperature, FIG. 9 is equal to 0.59 for the superparamagnetic component and 0.68 for the magnetic component. This difference may indicate a variation in the degree of inversion between smaller and larger particles in the distribution. However, since relatively large errors are usually associated with estimates of Mossbauer absorption spectral areas of poorly resolved sites one may simply state the weighted average of these values Fe(A)/Fe(B)=0.64, as being characteristic of the entire sample. At 4.2° K an even larger value of the ratio Fe(A)/Fe(B)=0.75 is obtained. However, the line broadening observed in the magnetic spectra due to the presence of a distribution of magnetic hyperfine fields, combined with poorer spectral statistics make the 4.2° K value less reliable. Nevertheless, all ratio estimates fall within the range of values observed for bulk or small-particle cobalt ferrite samples. The 4.2° K values of the internal magnetic hyperfine fields observed, $H_{hf}(A)$=501 kOe and $H_{hf}(B)$=526 kOe (Table 1) are consistent with those previously reported for $COFE_2O_4$ magnetic fluids containing 5 nm cobalt ferrite particles.

The magnetic properties of the block copolymer samples were measured using a Quantum Design MPMS SQUID magnetometer. Experimentation was carried out between 5° K and 300° K and in fields up to 50 kOe.

The magnetic properties (magnetization vs. applied magnetic field at room temperature, 77° K and 5° K) of the $CoFe_2O_4$ polymer nanocomposite for m/n=400/50, 400/150, 400/200, and 400/250 are shown in FIGS. 11–14 and in Table 2.

TABLE 2

Coercivity ($H_C$), remanence ($\sigma_T$), maximum magnetization ($\sigma_{max}$), equivalent magnetization $\sigma_{eq}$ and remanence $\sigma_T^{eq}$ of the diblock copolymer-$CoFe_2O_4$ nanocomposite at various temperatures.

| T(K) | $H_c$(kOe) | $\sigma_T$(emu/g) | $\sigma_T^{eq}$(emu/g) | $\sigma_{max}$(emu/g) | $\sigma_{eq}$(emu/g) |
|---|---|---|---|---|---|
| 300 | 0 | 0 | 0 | 1.03 | 18.04 |
| 77 | 0.1 | $3.4 \cdot 10^{-2}$ | 0.6 | 2.12 | 37.19 |
| 5 | 5.3 | 0.68 | 11.3 | 3.25 | 57.1 |

The measured magnetization was divided by the total mass of the film used.

As shown, at room temperature, the magnetization curve exhibits no hysteresis, and the nanocoposite films are perfectly superparamagnetic. Both the remanence and coercivity are zero at 300° K. The maximum magnetization $\sigma_{max}$ is 1.03 emu/g at an applied field of 50 kOe. $\sigma_{max}$=1.03 emu/g corresponds to 18.04 emu/g of $CoFe_2O_4$ since the nanocoposite contains 5.7% of $COFE_2O_4$ by weight.

At 77° K, the nanocomposite films exhibit a very small remanence ($\sigma_T=3.4 \cdot 10^{-2}$ emu/g) and coercivity ($H_C$=100 Oe). The maximum magnetization, $\sigma_{max}$ at this temperature is 2.12 emu/g and corresponds to 37.19 emu/g of $CoFe_2O_4$.

At 5° K, complete blocking of spin reversal occurs and the nanocomposite films become ferri-magnetic. At this temperature the coercivity $H_C$ is 5.3 kOe and the remanence $\sigma_T$ is 0.68 emu/g, which is equivalent to 11.93 emu/g of $CoFe_2O_4$. The maximum magnetization ($\sigma_{max}$) at this temperature is 3.25 emu/g corresponding to 57.1 emu/g of $CoFe_2O_4$.

The data of Table 2 shows that although the coercivity $H_C$ becomes equal to that of bulk $COFE_2O_4$ (5.3 kOe at 5° K), both the remanence ($\sigma_T$) and maximum magnetization ($\sigma_{max}$) is lower than that of the bulk oxide (67 emu/g and 80.8 emu/g, respectively). The reduction in maximum magnetization is a manifestation of a surface effect which results in a core of aligned spins surrounded by a magnetically disordered shell under the applied magnetic field. The surface spins have multiple configurations for any orientation of the core magnetization and do not generally contribute to the magnetization.

There are several reasons to expect surface spin disorder in ferrite nanoparticles. The superexchange interaction between magnetic cations is antiferromagnetic. Ferrimagnetic order arises because the intersublattice exchange ($J_{AB}$) is stronger than the intrasublattice ($J_{BB}$) exchange. Variations in coordination of surface cations result in a distribution of net exchange fields, both positive and negative with respect to a cation sublattice. Since the interaction is mediated by an intervening oxygen ion, exchange bonds are broken if an oxygen ion is missing from the surface. If organic molecules are bonded to the surface, the electronics involved can no longer participate in the superexchange. Both types of broken exchange bonds further reduce the effective coordination of the surface cations. The superexchange is also sensitive to bond angles and lengths which would likely be modified near the surface.

In an ideal case, the ratio between the volume of the magnetically active core $V_m$ and the total volume of the particle (V) is equal to the ratio of the maximum magnetization $\sigma_{max}$ (T,H) of the nanoparticle and the magnetization of the bulk material at the same temperature and magnetic field, $\sigma_{bulk}$ (T,H):

$$\frac{V_m}{V} = \frac{\sigma_{\max}(T, H)}{\sigma_{bulk}(T, H)} \quad (1)$$

The thickness of the magnetically disordered shell at 5° K is estimated to be 5.5 Å from Equation 1. This value is in reasonable agreement with the reported values of small ferrite particles.

Diblock copolymers of $(NOR)_m/(NORCOOH)_n$ were synthesized with m/n ratios of 400/50, 400/150, 400/200, and 400/250. Gel permeation Chromatography (GPC) confirmed that the molecular mass distribution of the synthesized polymer with m/n=400/50 was unimodal and was relatively narrow as determined by the measured Polydispersity Index (PDI) of 1.15. The method of the present invention is a metal oxide templating method, which is markedly unique in that the metal salt is introduced while the polymer is in solution before any microphase separation of the two blocks can occur. This is a novel choice of solvents and metal materials in order that they may be dissolved in a common solvent. The advantages which the disclosed templating process presents, are a rapid diffusion and attachment of the metal to the polymer since both are in the liquid state and resultant self-assembled nanostructures at room temperature through wet chemical methods. Thus, this makes a more attractive process to integrate into the fabrication of novel magnetic devices without requiring additional thermal cycling steps.

Figure 16:
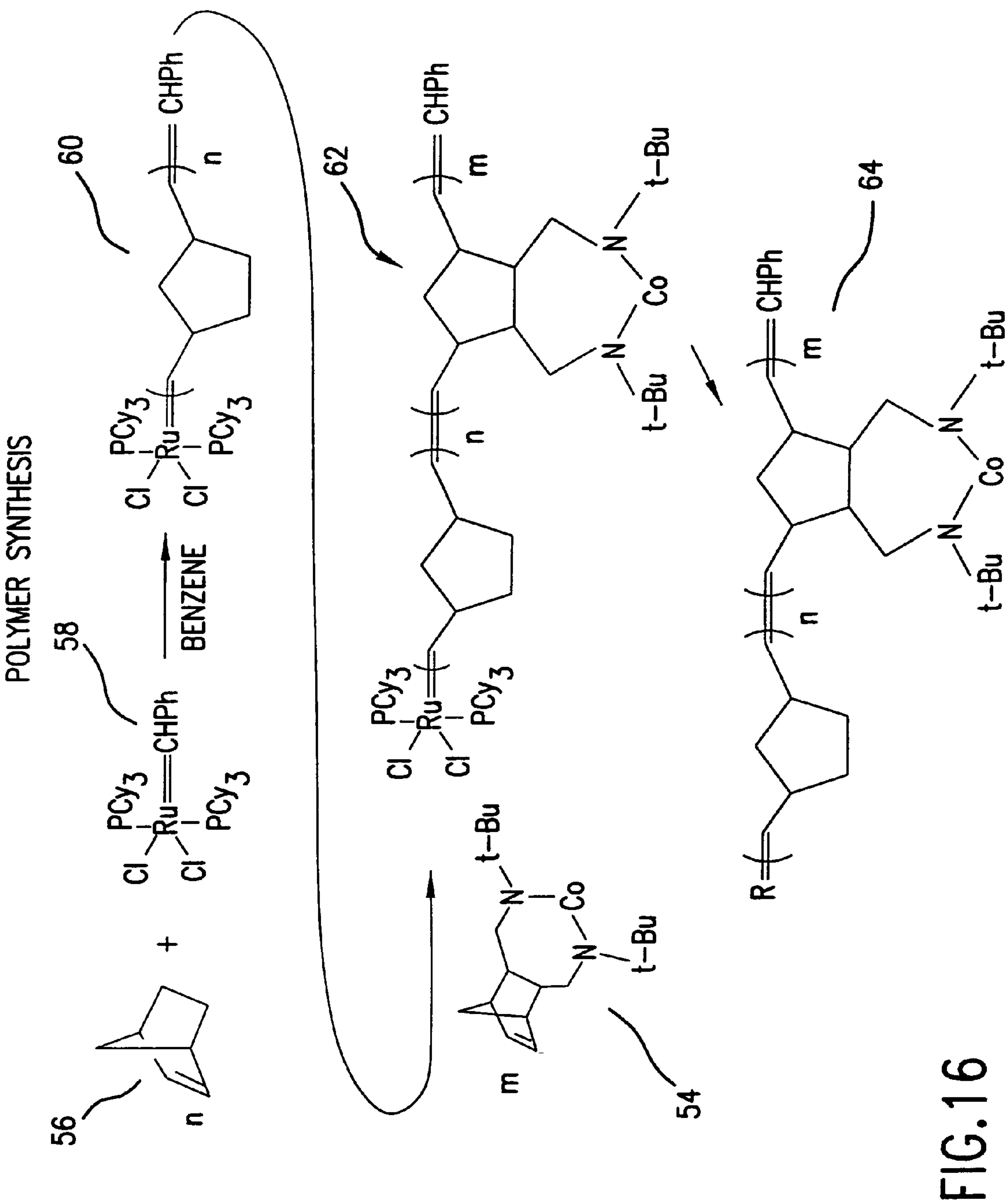
FIG. 16 shows the process of $[NOR]_m/[Co(bTAN)]_n$ synthesis.
Figure 17:
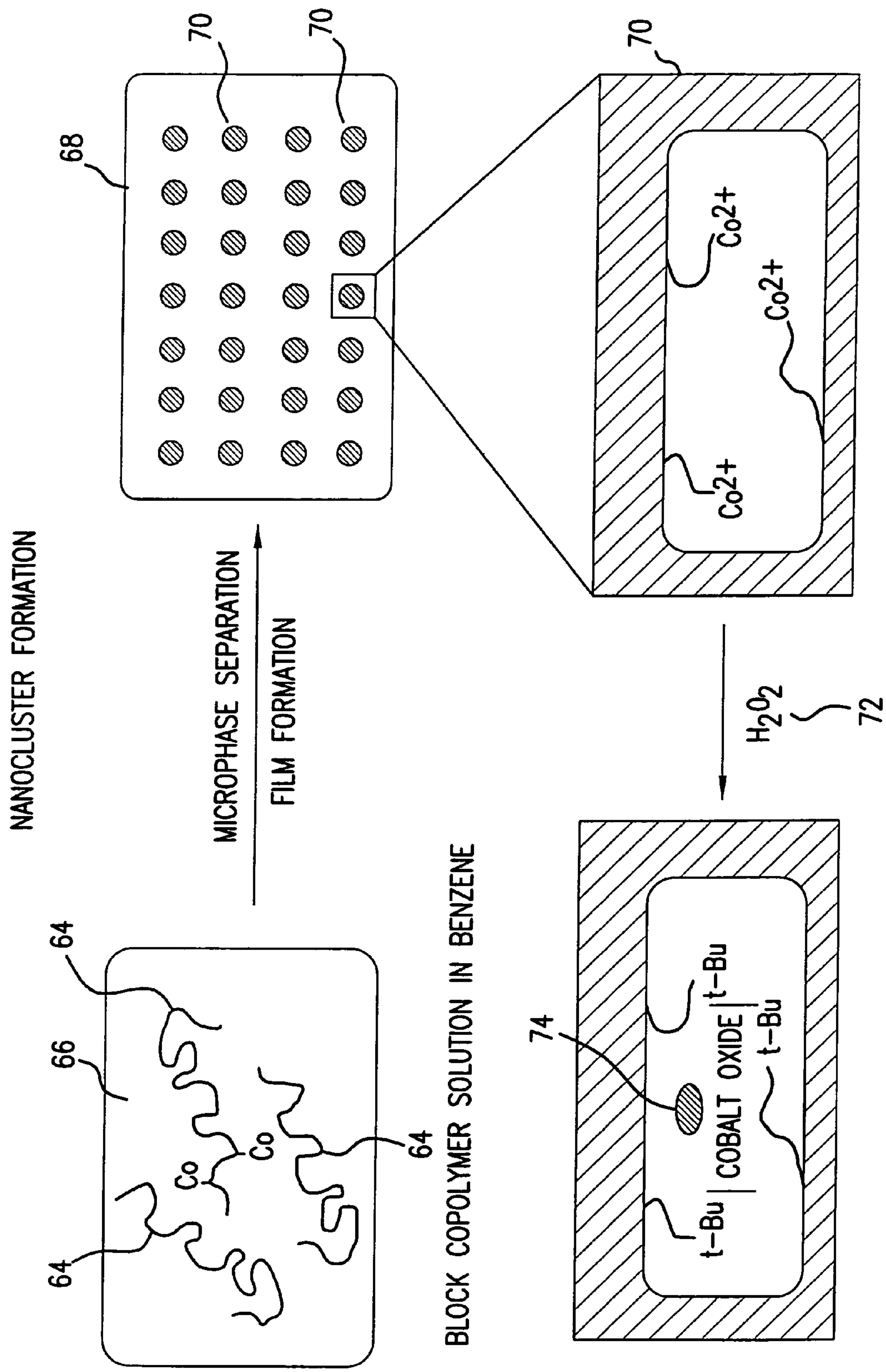
FIG. 17 shows the process of $Co_3O_4$ nanocluster formation.

The principles of the method of the present invention were also used for controlled room temperature synthesis of $Co_3O_4$, in the specific reaction scheme where the Co atom is directly attached to the monomer during polymerization prior to creation of the diblock copolymer. The method of synthesis of $Co_3O_4$ nanoclusters within a diblock copolymer is divided into stages of:

(a) synthesis of norbornene-cobalt monomer, shown in FIG. 16, (b) polymer synthesis, shown in FIG. 16, and (c) nanocluster formation, shown in FIG. 17.

Figure 15:
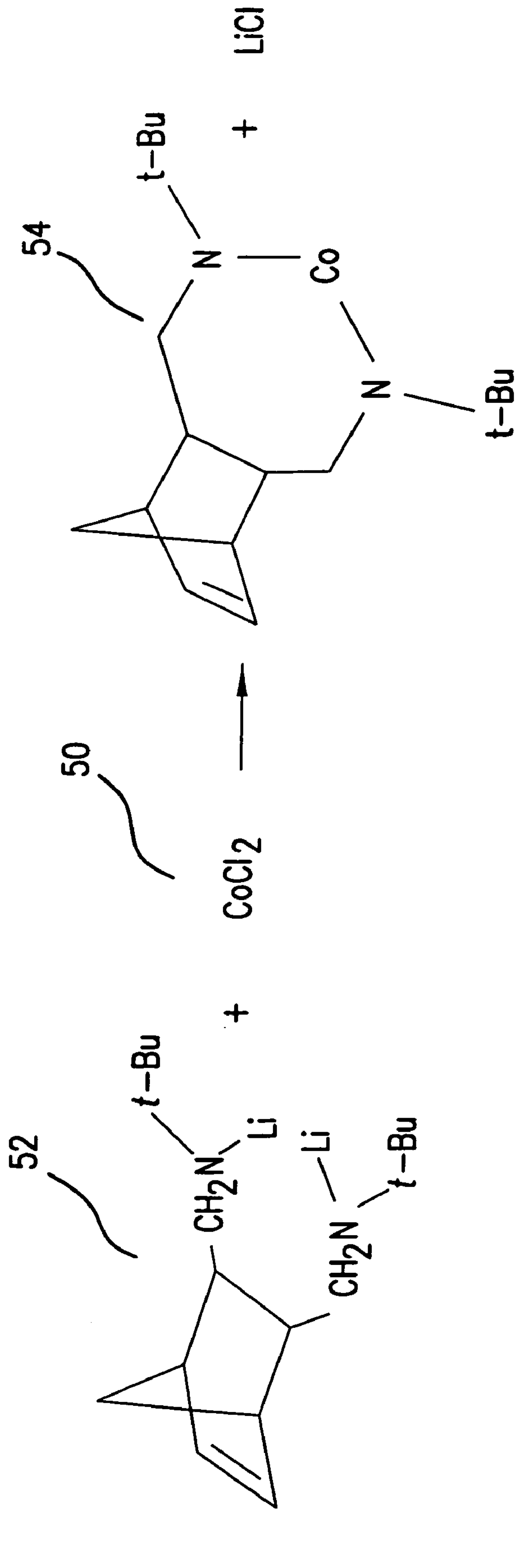
FIG. 15 shows schematically the process of synthesis of norbornene-cobalt monomer.

In the stage of the monomer synthesis, shown in FIG. 15, cobalt chloride ($CoCl_2$) (0.47 g, 3.6 mmol) which is commercially available from Aldrich, was dissolved in 50 ml of tetrahydrofuran (THF). $Li_2$(bTAN) (lithium-trans-2,3-bis (tert-butylamidomethyl) norbornen-5-ene) was prepared and 1 g (3.6 mmol) of $Li_2$(bTAN) 52 was dissolved in ether and then added to $CoCl_2$ 50 dissolved in THF at −40° C. The mixture turned to dark brown as the mixture was stirred and warmed at room temperature. After two hours, the volatile components were removed under vacuum, and the residual was extracted with 50 ml of pentane. The solution was extracted under vacuum and a light blue oil like Co(bTAN) (cobalt(trans-2,3-bis(TRT-butylamidomethyl) norborn-5-ene)) 54 was obtained.

In the polymer synthesis stage, shown in FIG. 16, NOR-Co(bTAN) diblock copolymers were synthesized by ring opening methesis polymerization of norbornene (NOR) 56 and Co(bTAN) 54. A 4% solution of norbornene was prepared by disposing 0.25 g NOR 56 (2.65-3 mol, 500 equivalent) in 6 ml benzene. The polymerization of NOR chains was initiated by adding 2.6 mg (5.3-6 mol, 1/500 equivalent) of Grubb's catalyst 58 (or adequate quantity of Schrock's catalyst) to form a chain of NOR molecules 60 with attached catalyst. Then, 5.45-2 g of Co(bTAN) 54 (21.4-3 mol, 40 equivalent) was added to the living polymer solution 60 after 15 minutes since the initiation of the NOR chain polymerization to form a molecule 62. The polymerization was terminated after 1 hour by adding an unsaturated ether which cleaved the molecule catalyst from the chain 62. The resultant $[NOR]_{500}/[Co(bTAN)]_{40}$ block 64 was precipitated in pentane inside the glove box and was dried under vacuum before static film casting.

Further, as shown in FIG. 17, the nanocluster formation was initiated with preparation of 1% polymer solution 66 by dissolving the resultant diblock copolymer 64 in benzene. Solid films 68 were formed by static casting the polymer solution 66 over a period of approximately ten days. The polymer film 68 with the separated microphases 70 was washed with hydrogen peroxide ($H_2O_2$) 72 for 24-hours. As a result, cobalt atoms were disassociated from the polymer backbone and $Co_3O_4$ (cobalt oxide) nanoparticles 74 were formed.

Figure 18:
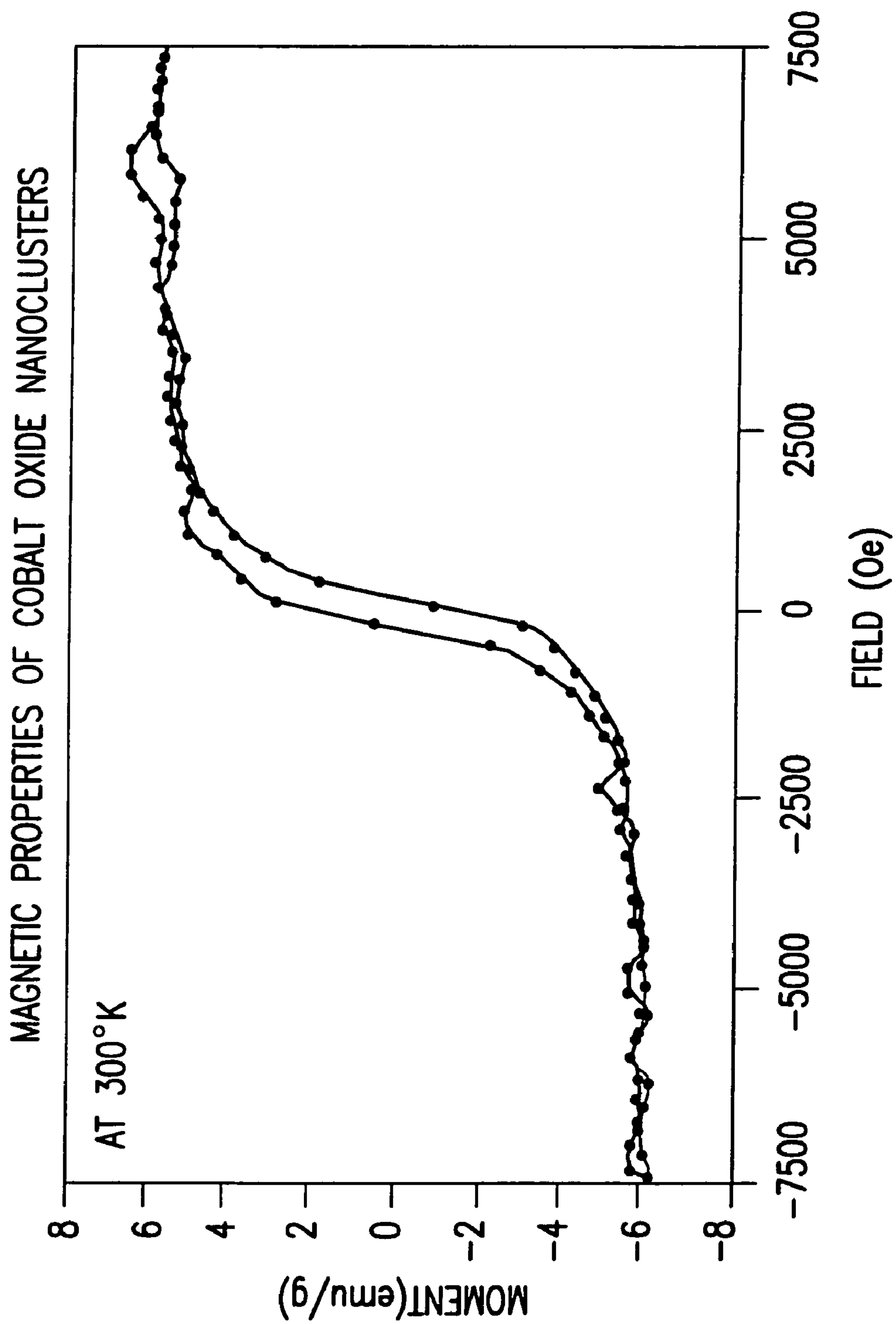
FIG. 18 is a diagram representing magnetic properties of synthesized $Co_3O_4$ nanostructures at room temperature.
Figure 19:
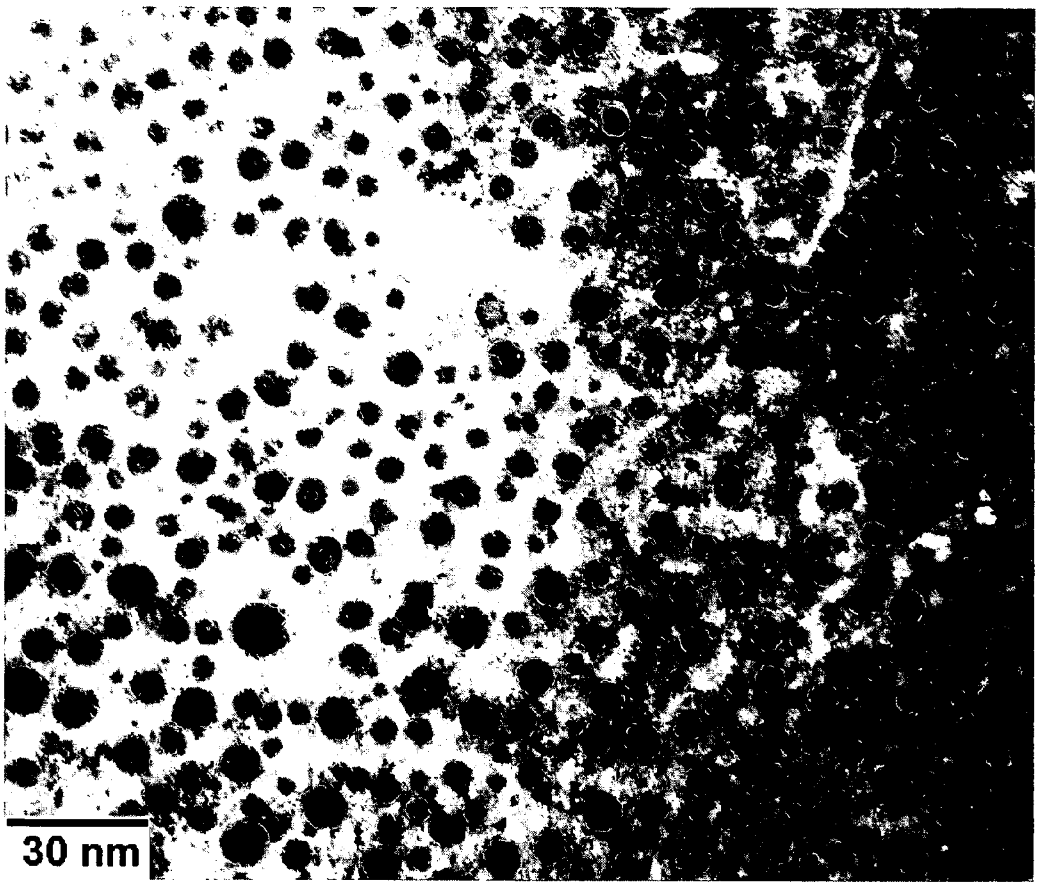
FIG. 19 is the image of cobalt oxide nanoclusters obtained with transmission electron microscope (TEM); and, FIG. 20 is a diagram representing a FTIR (Fourier transform infrared spectroscopy) spectra for the sample of the created $Co_3O_4$ nanocomposite.

Magnetic properties of the created nanoclusters distributed within the diblock copolymer matrix are presented in FIG. 18, showing the diagram of moment (emu/g) vs. field applied to the sample. The TEM study of cobalt excited nanoclusters show that the polymer-$Co_3O_4$ nanocomposite consists of 15 nm diameter $Co_3O_4$ nanoparticles embedded in a polymer matrix, as shown in FIG. 19. The nanoparticles are magnetically isolated and the distance between the particles is approximately 15 nm. Taking these two parameters into account, the particle density was calculated to be 110 9/sm$^2$. Due to the ferromagnetic nature of the nanoparticles, one bit of information may be stored into each particle. As a result, ultra high density magnetic recording media with the capacity of 110 gb/sm$^2$ may be fabricated using this nanocomposite. In addition to this, like traditional magnetic recording media, the metals are attached to the polymer during synthesis and the magnetic ordering occurs during film formation. These advantages will significantly reduce the number of steps required for fabrication of such magnetic recording media.

Figure 20:
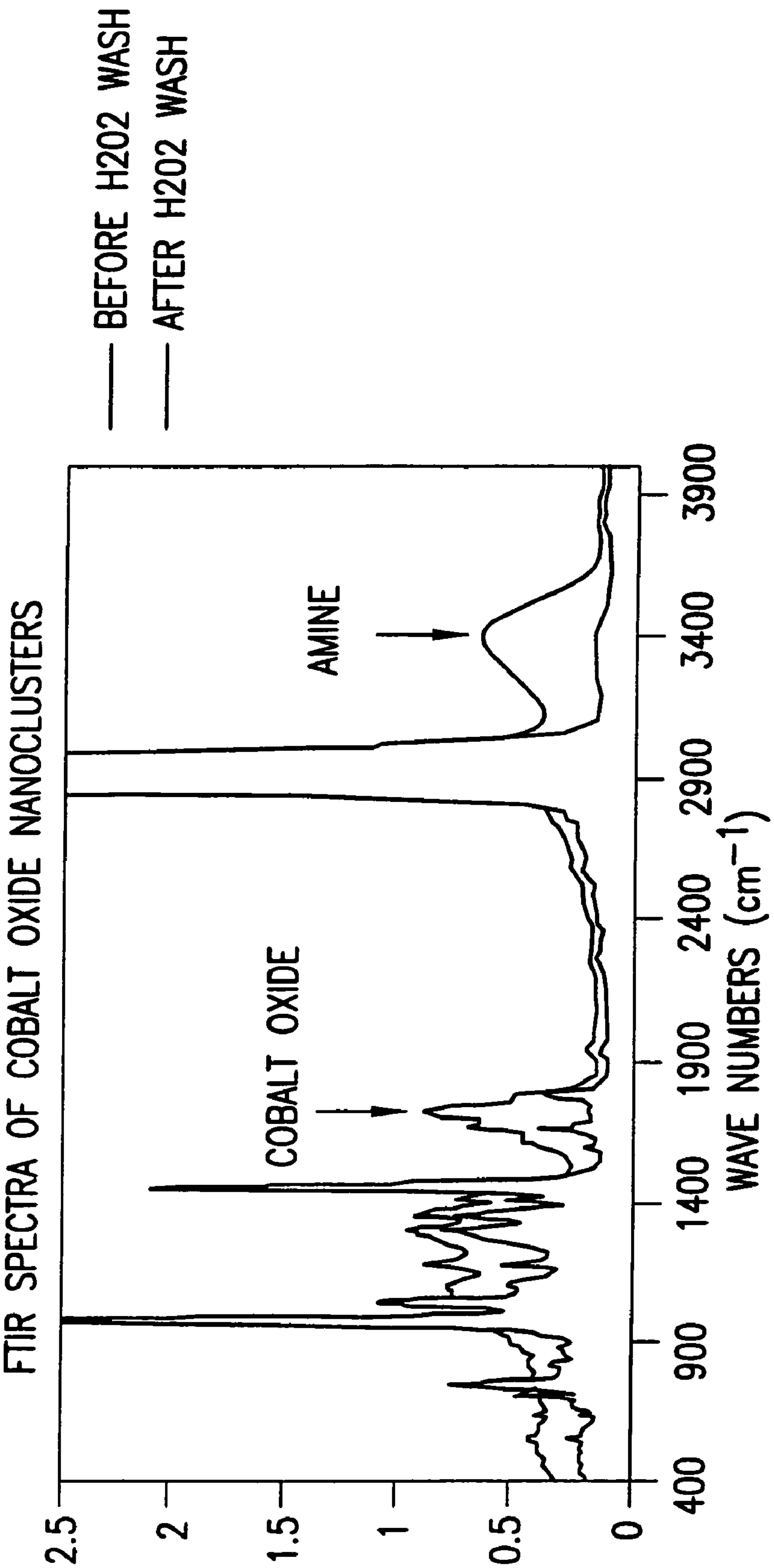

FTIR spectra was obtained, shown in FIG. 20. The study shows that before $H_2O_2$ wash, no amine peak is shown, indicating that cobalt atom is attached to the polymer. After $H_2O_2$ wash, free amine peak is observed at 3400 nm indicating that Co atom is cleaved from the polymer. Additionally, the new peak at 1725 nm indicates formation of magnetic cobalt oxide.

The created nanocluster of $Co_3O_4$ is optically transparent. This optically transparent magnetic film can also be used as an invisible magnetic water mark in security papers. Due to the transparent thin flexibility of the material, a thin invisible pattern can be deposited on security papers. The small regions of the nanoclusters would give the water mark a particular magnetic signature which would amount to stored information.

Thus, by the method of the present invention, $CoFe_3O_4$ nanoclusters within $[NOR]_m/[NORCOOH]_n$ diblock copolymer and $Co_3O_4$ nanoclusters within $[NOR]_m/[Co(bTAN)]_n$ diblock copolymer have been synthesized as separated domains within diblock copolymer matrix. The self-assembled nature of domain structure permits control over the shape and size of the nanoclusters. Polymer matrix also provides kinetic hindrance to aggregation of nanoclusters in larger particles. Nanoclusters within block copolymer show 3-D ordering and the density of nanoclusters are high enough for synthesizing non-linear devices for commercial application.

Self-assembled $CoFe_3O_4$ and $Co_3O_4$ nanoclusters were successfully synthesized at room temperature within the liquid phase by using the micro-phase separation property of diblock copolymers. The FTIR study verified that the metal existed within the micro-phase separated domains. The room temperature templating method of the present invention for self-assembly is an important step towards using the nanocomposites embedded within the diblock copolymer matrices for use in an increasing number of high technology applications.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of room temperature synthesis of magnetic metal oxide nanoclusters within a matrix of a diblock copolymer, comprising the steps of:

a. synthesizing, by a ring opening metathesis polymerization technique, said diblock copolymer including a first polymer block and a second polymer block having a predetermined repeat unit ratio m/n of said first and second polymer blocks wherein said predetermined repeat unit ratio m/n is selected from the group consisting of m having a value of 400 and n within the approximate range 50–250, the diblock copolymer being $[NOR]_m/[NORCOOH]_n$ and said first polymer block being norbornene (NOR) and said second polymer block being norbornene-dicarboxylic acid (NOR-COOH);

b. introducing, at room temperature, $FeCl_3$ and $CoCl_2$ as precursors into said diblock copolymer to attach $FeCl_3$ and $CoCl_2$ molecules to said second polymer block (NORCOOH) of said $[NOR]_m/[NORCOOH]_n$ diblock copolymer, thereby forming in a liquid phase the diblock copolymer containing said at least one metal; and, c. processing said diblock copolymer by substituting chlorine atoms of said $FeCl_3$ and $CoCl_2$ precursors with oxygen atoms to form a plurality of mixed metal oxide $CoFe_2O_4$ nanoclusters within said $[NOR]_m/[NORCOOH]_n$ diblock copolymer, wherein said precursors are introduced prior to a microphase separation of the polymer blocks.

2. The method of claim 1 wherein the step of synthesizing includes the step of synthesizing said diblock copolymer $[NOR]_m/[NORCOOH]_n$ by said ring opening metathesis polymerization of norbornene (NOR) and norbornene trimethylsilane (NORCOOTMS) in presence of a Bis (tricyclohexylphosphine) benzylidine ruthenium (IV) dichloride catalyst, resulting in the formation of a $[NOR]_m/[NORCOOTMS]_n$ diblock copolymer solution; and, precipitating said $[NOR]_m/[NORCOOTMS]_n$ diblock polymer solution in a mixture of methanol, acetic acid and water to convert said $[NOR]_m/[NORCOOTMS]_n$ diblock polymer into said $[NOR]_m/[NORCOOH]_n$ diblock copolymer.

3. The method of claim 2, wherein step (a) includes the step of dissolving 1 g of norbornene (NOR) in 25 ml of anhydrous tetrahydrofuran (THF) to form a 4 gram-% solution of norbornene (NOR) in THF prior to synthesizing said diblock copolymer.

4. The method of claim 3, wherein the step of synthesizing includes the step of initiating polymerization of said polymer block of norbornene in said 4 gram-% solution of norbornene (NOR) in THF by adding 0.75 ml of said Bis (tricyclohexylphosphine) benzylidine ruthenium (IV) dichloride catalyst solution to said solution of norbornene (NOR) in THF.

5. The method of claim 4, wherein the step of synthesizing includes the step of adding a solution of said norbornene trimethylsilane (NORCOOTMS) to said solution of norbornene (NOR) in THF a predetermined time period after initiating the polymerization of said first polymer block of norbornene.

6. The method of claim 5, wherein said predetermined time period is approximately 1 hour.

7. The method of claim 2, wherein the step of synthesizing includes the steps of:

initiating synthesis of said $[NOR]_m/[NORCOOTMS]_n$ diblock polymer solution by polymerization of said polymer block NORCOOTMS by adding said catalyst solution to said NORCOOTM; and, adding norbornene to said NORCOOTMS polymer block a predetermined time period after the initiating the polymerization of said NORCOOTM polymer block.

8. The method of claim 5, wherein the step of synthesizing includes the step of:

terminating said synthesis of $[NOR]_m/[NORCOOTMS]_n$ approximately 24 hours after adding said solution of said norbornene trimethylsilane (NORCOOTMS) to said solution of norbornene (NOR) in THF prior to said step of precipitating said $[NOR]_m/[NORCOOTMS]_n$ diblock polymer solution in said mixture of methanol, acetic acid and water.

9. The method of claim 2, wherein the step of synthesizing includes the step of drying said $[NOR]_m/[NORCOOH]_n$ diblock copolymer solution under vacuum.

10. The method of claim 1, wherein the step of introducing includes the steps of:

dissolving said $[NOR]_m/[NORCOOH]_n$ diblock copolymer in tetrahydrofuran (THF) to form a diblock copolymer solution; and, introducing said $FeCl_3$ and $CoCl_2$ precursors into said diblock copolymer solution to form a resulting solution comprising:

$[NOR]_m/[NORCOOH]_n:FeCl_3:CoCl_2$ related each to the other in quantities of 1:25.0:12.5 mole.

11. The method of claim 10, wherein the step of introducing includes the step of forming solid films from said resulting solution by static casting of said resulting solution.

12. The method of claim 11, further wherein the step of introducing includes the step of static casting of said resulting solution over a period of 72 hours.

13. The method of claim 11, wherein the step of processing includes the step of washing said formed solid films with NaOH and water to substitute chlorine atoms of said $FeCl_3$ and $CoCl_2$ molecules with oxygen atoms to form a plurality of nanoclusters of $CoFe_2O_4$ within said $[NOR]_m/[NORCOOH]_n$ diblock copolymer.

14. A method of room temperature synthesis of magnetic metal oxide nanoclusters within a matrix of a diblock copolymer, comprising the steps of:

a. synthesizing, by a ring opening metathesis polymerization technique, said diblock copolymer including a first polymer block and a second polymer block having a predetermined repeat unit ratio m/n of said first and second polymer blocks;

b. introducing, at room temperature, at least one precursor containing an at least one metal into one of said first and second polymer blocks, thereby forming in a liquid phase the diblock copolymer containing said at least one metal, dissolving $CoCl_2$ in tetrahydrofuran (THF) thus forming a solution of $CoCl_2$ in THF, and dissolving Lithium-trans-2,3-bis (Tert-butylamidomethyl) norborn-5-ene ($Li_2$(bTAN) in ether, thus forming a solution of $Li_2$ (bTAN) in ether, and adding said solution of $Li_2$ (bTAN) in ether to said solution of $CoCl_2$ in THF to form cobalt (trans-2,3-bis(tert-butyl amidomethyl) norborn-5-ene (Co(bTAN)); and, c. processing said diblock copolymer containing said at least one metal by a wet chemical technique to form a plurality of metal oxide nanoclusters within said diblock copolymer matrix, wherein said metal precursor is introduced prior to a microphase separation of the polymer blocks.

15. The method of claim 14, wherein the step of synthesizing includes the step of synthesizing said diblock copolymer $[NOR]_m/[NOR\text{-}Co]_n$ by the ring opening metathesis polymerization of norbornene (NOR) and Co(bTAN) formed in said step (b), said first polymer block including norbornene (NOR) and said second polymer block including Co(bTAN).

16. The method of claim 15, wherein said m/n=500/40 to form the $[NOR]_{500}/[CO(bTAN)]_{40}$ diblock copolymer.

17. The method of claim 14, wherein the step of synthesizing the steps of:

forming said solution of $CoCl_2$ in THF by dissolving 0.47 g (3.6 mmol) of said $CoCl_2$ in 50 ml of said THF at the temperature −40° C.;

forming said solution of $Li_2$ (bTAN) in ether by dissolving 1 g (3.6 mmol) of said $Li_2$ (bTAN) in said ether;

maintaining a mixture of said solution of $CoCl_2$ in THF and of said solution of $Li_2$ (bTAN) in ether at room temperature for approximately 2 hours; and extracting said Co(bTAN) with 50 ml of pentane.

18. The method of claim 15, wherein the step of synthesizing includes the step of preparing a 4% solution of norbornene (NOR) in benzene by dissolving of 0.25 grams of norbornene ($2.65^{-3}$ mol, 500 equivalent) in 6 ml of benzene prior to said synthesis of said $[NOR]_m/[NORCO]_m$.

19. The method of claim 18, wherein the step of synthesizing includes the step of initiating the polymerization of said $[NOR]_m/[Co(bTAN)]_n$ diblock copolymer by adding a Bis (tricyclohexylphosphine) benzylidine ruthenium (IV) dichloride catalyst solution to said solution of norbornene (NOR) in benzene to form an NOR polymer solution.

20. The method of claim 19, wherein the step of synthesizing includes the step of adding 2.7 mg ($5.3^{-6}$ mol, 1/500 equivalent) of said catalyst solution.

21. The method of claim 19, wherein the step of synthesizing includes the step of adding $5.45^{-2}$ g of said Co(bTAN) ($21.4^{-3}$ mol, 40 equivalent) to said NOR polymer solution after approximately 15 minutes from the introduction of said catalyst solution to form a resultant said $[NOR]_m/[Co(bTAN)]_n$ diblock copolymer.

22. The method of claim 21, wherein the step of synthesizing includes the steps of:

precipitating said resultant $[NOR]_m/[Co(bTAN)]_n$ diblock copolymer in pentane; and, drying said precipitated $[NOR]_m/[Co(bTAN)]_n$ diblock polymer.

23. The method of claim 22, wherein the step of synthesis includes the steps of:

preparing a 1% solution of said precipitated $[NOR]_m/[Co(bTAN)]_n$ diblock copolymer in benzene;

forming solid films of said $[NOR]_m/[Co(bTAN)]_n$ diblock copolymer by static casting of said solution of said precipitated $[NOR]_m/[Co(bTAN)]_n$ diblock copolymer in benzene over a period of approximately 240 hours; and, washing said solid films with hydrogen peroxide ($H_2O_2$) for a period of approximately 24 hours to form $Co_3O_4$ nanoparticles within $[NOR]_m/[Co(bTAN)]_n$ diblock copolymer.

24. A method of room temperature synthesis of $CoFe_2O_4$ nanoclusters within a diblock copolymer matrix, comprising the steps of:

ring opening metathesis polymerization of norbornene (NOR) and norbornene trimethylsilane (NORCOOTMS) in presence of a catalyst to form a $[NOR]_{400}/[NORCOOTMS]_{50}$ diblock polymer;

converting said $[NOR]_{400}/[NORCOOTMS]_{50}$ diblock polymer into a $[NOR]_{400}/[NORCOOH]_{50}$ diblock copolymer by precipitating said $[NOR]_{400}/[NORCOOTMS]_{50}$ diblock polymer in a mixture of methanol, acetic acid and water;

introducing $FeCl_3$ and $CoCl_2$ precursors into said $[NOR]_{400}/[NORCOOH]_{50}$ diblock copolymer, thus forming a mixture of said $[NOR]_{400}/[NORCOOH]_{50}$, $FeCl_3$ and $CoCl_2$, the $FeCl_3$ and $CoCl_2$ molecules attaching themselves to the NORCOOH blocks of said $[NOR]_{400}/[NORCOOH]_{50}$ diblock copolymer;

forming solid films of said mixture of $[NOR]_{400}/[NORCOOH]_{50}$, $FeCl_3$ and $CoCl_2$; and, washing said solid films with NaOH and water, thus forming $CoFe_2O_4$ nanoclusters within the $[NOR]_{400}/[NORCOOH]_{50}$ diblock copolymer matrix.

25. The method of claim 24, wherein the step of ring opening metathesis polymerization includes the step of initiating formation of said $[NOR]_{400}/[NORCOOTMS]_{50}$ diblock polymer by adding said catalyst to said (NORCOOTMS) to create a poly-NORCOOTMS block, and further adding said (NOR) to said poly-NORCOOTMS block.

26. The method of claim 24, further wherein the step of ring opening metathesis polymerization includes the step of initiating formation of said $[NOR]_{400}/[NORCOOTMS]_{50}$ diblock polymer by adding said catalyst to said (NOR) to create a poly-NOR block, and further adding said (NORCOOTMS) to said poly-NOR block.

27. A method of room temperature synthesis of $Co_3O_4$ nanoclusters within a diblock copolymer matrix, comprising the steps of:

a. synthesizing cobalt (trans-2,3-bis(tert-butylamidomethyl) norborn-5-ene(Co(bTan)) by mixing a solution of $CoCl_2$ in tetrahydrofuran and a solution of Lithium-trans-2,3-bis(tert-butylamidomethyl) norborn-5-ene ($Li_2$(bTAN)) in ether;

b. ring opening metathesis polymerization of norbornene (NOR) and said Co(bTAN) in the presence of a catalyst to form a $[NOR]_{500}/[Co(bTAN)]_{40}$ diblock copolymer;

c. forming a plurality of solid films of said $[NOR]_{500}/[Co(bTAN)]_{40}$ diblock copolymer; and, d. washing said solid films with hydrogen peroxide ($H_2O_2$), thus forming a plurality of $Co_3O_4$ nanoclusters within a matrix of the $[NOR]_{500}/[Co(bTAN)]_{40}$ diblock copolymer.

* * * * *